(12) United States Patent
McElvain et al.

(10) Patent No.: US 11,941,791 B2
(45) Date of Patent: Mar. 26, 2024

(54) HIGH-DYNAMIC-RANGE IMAGE GENERATION WITH PRE-COMBINATION DENOISING

(71) Applicant: Dolby Laboratories Licensing Corporation, San Francisco, CA (US)

(72) Inventors: Jon S. McElvain, Manhattan Beach, CA (US); Walter C. Gish, Oak Park, CA (US); Gregory John Ward, Berkeley, CA (US); Robin Atkins, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 367 days.

(21) Appl. No.: 17/601,529

(22) PCT Filed: Apr. 9, 2020

(86) PCT No.: PCT/US2020/027439
§ 371 (c)(1),
(2) Date: Oct. 5, 2021

(87) PCT Pub. No.: WO2020/210472
PCT Pub. Date: Oct. 15, 2020

(65) Prior Publication Data
US 2022/0198625 A1 Jun. 23, 2022

Related U.S. Application Data

(60) Provisional application No. 62/832,617, filed on Apr. 11, 2019.

(30) Foreign Application Priority Data

Apr. 11, 2019 (EP) .................................... 19168612

(51) Int. Cl.
G06T 5/20 (2006.01)
G06T 5/50 (2006.01)
H04N 23/741 (2023.01)

(52) U.S. Cl.
CPC .................. *G06T 5/92* (2024.01); *G06T 5/20* (2013.01); *G06T 5/50* (2013.01); *G06T 5/70* (2024.01);
(Continued)

(58) Field of Classification Search
CPC ........... G06T 5/009; G06T 5/002; G06T 5/20; G06T 5/50; G06T 2207/20208;
(Continued)

(56) References Cited

U.S. PATENT DOCUMENTS 7,840,066 B1 11/2010 Chen
9,077,913 B2 7/2015 Hasinhoff
(Continued)

FOREIGN PATENT DOCUMENTS

JP 2012533961 A 12/2012
JP 2013162359 A 8/2013
(Continued)

OTHER PUBLICATIONS

Akyuz, A. O. et al "Noise Reduction in High Dynamic Range Imaging" J. Vis. Comm. Image R. Apr. 2007, pp. 366-376.
(Continued)

*Primary Examiner* — Neil R McLean

(57) ABSTRACT

A method for generating a high-dynamic-range (HDR) image includes (a) denoising a short-exposure-time image, wherein the denoising comprises applying a first guided filter to the short-exposure-time image, the guided filter utilizing a long exposure-time-image as its guide, (b) after the step of denoising, scaling at least one of the short-exposure-time image and the long-exposure-time image to
(Continued)

place the short-exposure-time image and the long-exposure-time image on a common radiance scale, and (c) after the step of scaling, merging the short-exposure-time image with the long-exposure-time image to generate the HDR image.

18 Claims, 12 Drawing Sheets

(52) U.S. Cl.
CPC . *H04N 23/741* (2023.01); *G06T 2207/20208* (2013.01); *G06T 2207/20221* (2013.01)

(58) Field of Classification Search
CPC .......... G06T 2207/20221; G06T 2207/10144; H04N 23/741; H04N 25/134; H04N 25/583; H04N 23/81; H04N 23/84
USPC ........................................................ 382/274
See application file for complete search history.

(56) References Cited

U.S. PATENT DOCUMENTS

| | | |
|---|---|---|
| 9,131,201 B1 | 9/2015 | Geiss |
| 9,275,445 B2 | 3/2016 | Granados |
| 9,344,639 B2 * | 5/2016 | Musatenko ............... G06T 5/50 |
| 9,479,695 B2 | 10/2016 | Lim |
| 9,521,351 B1 | 12/2016 | Endsley |
| 9,626,745 B2 | 4/2017 | Baqai |
| 9,860,456 B1 | 1/2018 | Musatenko |
| 2016/0050354 A1 | 2/2016 | Musatenko |
| 2016/0352995 A1 * | 12/2016 | Min .................... H04N 23/741 |
| 2017/0270644 A1 | 9/2017 | Zhao |
| 2021/0248758 A1 | 8/2021 | Li |

FOREIGN PATENT DOCUMENTS

| | | |
|---|---|---|
| JP | 2016201733 A | 12/2016 |
| WO | 20151242121 W | 8/2015 |

OTHER PUBLICATIONS

Daniilidis K. et al "Computer Vision—ECCV 2010" Lectures notes in Computer Science, vol. 6311, Springer, Berlin, Heidelberg.
Eilertsen, G. et al "The High Dynamic Range Imaging Pipeline" Jun. 1, 2018 pp. 1-132.
Hajisharif, S. et al "Adaptive dualISO HDR reconstruction" Dec. 2015, EURASIP Journal on Image and Video Processing.
He, K. et al "Guided Image Filtering" IEEE Transactions on Pattern Analysis and Machine Intelligence, vol. 35, Issue 6, pp. 1397-1409.
Kopf, J. et al "Joint Bilateral Upsampling" ACM Trans. Graph, Article 96, Jul. 2007, pp. 1-5.
Kronander, J. et al "A Unified Framework for Multi-Sensor HDR Video Reconstruction" vol. 29, No. 2, Sep. 14, 2013, pp. 203-215.
Singh, H. et al "A Novel Approach for Detail-Enhanced Exposure Fusion Using Guided Filter" Feb. 2014, Hindawi Publishing Corporation, 8 pages.
Zhang, L. et al "Denoising vs. Deblurring: HDR Imaging Techniques Using Moving Cameras" IEEE Computer Society Conference on Computer Vision and Pattern Recognition, Jun. 2010.
Li, Y. et al "A Maximum A Posteriori Estimation Framework for Robust High Dynamic Range Video Synthesis", IEEE Transactions on Image Processing, vol. 26, issue 3, pp. 1143-1157, Mar. 2017.
Thomas, Jean-Baptiste et al "HDR Imaging Pipeline for Spectral Filter Array Cameras" May 2017, vol. 10270.

* cited by examiner

HIGH-DYNAMIC-RANGE IMAGE GENERATION WITH PRE-COMBINATION DENOISING

CROSS-REFERENCE TO RELATED APPLICATIONS

This application claims priority to U.S. Provisional Patent Application Ser. No. 62/832,617, filed on Apr. 11, 2019 and EP Patent Application Serial No. 19168612.0, filed on Apr. 11, 2019, each of which is hereby incorporated by reference in its entirety.

TECHNICAL FIELD

The present application relates to high-dynamic-range imaging.

BACKGROUND

Most handheld camera devices, such as smartphones, utilize an image sensor having a bit depth of 8 bits or maybe 10 bits. For many scenes, this bit depth is insufficient to capture both the brightest and darkest areas of the scene. For example, when taking a photo of a person that is backlit, the person's face may appear underexposed or, alternatively, the brighter background may appear overexposed.

High-dynamic-range (HDR) imaging functionality seeks to overcome this problem. Most commonly, an HDR digital camera captures two images of the same scene: one image with a short exposure time to get good image data for bright portions of a scene, and another image with a longer exposure time to get good image data for darker portions of the scene. These two images are then combined to produce a single HDR image of the scene that properly depicts both the brighter and the darker scene portions. The combination includes scaling the two images to a common radiance scale and then merging the two images.

The most widely used type of HDR digital camera uses temporal multiplexing, wherein a short-exposure-time image and a long-exposure-time image are captured sequentially. However, the temporal offset between the two exposures leads to motion artifacts when objects in the scene move between the two exposures, or if there is camera motion. To minimize motion artifacts, a newer type of HDR image sensor instead utilizes spatial multiplexing, where a first subset of the sensor pixels are operated with a short exposure time while a second subset of the sensor pixels, interlaced with the first subset, are operated with a long exposure time. To minimize temporal differences, the short-exposure-time pixels are exposed during exposure of the long-exposure-time pixels.

The vast majority of image sensors in used today, whether for HDR or standard single-exposure image capture, are color image sensors. To generate an HDR image from the image data captured at two different exposure times, the standard image processing pipeline of non-HDR digital color cameras is adapted to further include combination (scaling and merging) of the image data captured at the two different exposure times. The standard image processing pipeline denoises raw (non-HDR) image data from the color image sensor, and then demosaics the different color components to generate a full-color image, wherein each output pixel has complete color information. In HDR imaging, this standard image processing pipeline is conveniently expanded with an additional front end that scales and merges image data captured at the different exposure times. This front end generates image data of the same format as raw non-HDR image data, such that the existing standard pipeline (denoising and demosaicing) may proceed without any HDR adaptation needed.

SUMMARY

In an embodiment, a method for generating a high-dynamic-range (HDR) image includes (a) denoising a short-exposure-time image based, at least in part, upon structural information obtained from a long-exposure-time image, (b) after the step of denoising, scaling at least one of the short-exposure-time image and the long-exposure-time image to place the short-exposure-time image and the long-exposure-time image on a common radiance scale, and (c) after the step of scaling, merging the short-exposure-time image with the long-exposure-time image to generate the HDR image.

In an embodiment, a product for generating a high-dynamic-range HDR image sensor includes machine-readable instructions encoded in non-transitory memory. The machine-readable instructions include (a) denoising instructions that, when executed by a processor, denoise a short-exposure-time image based, at least in part, upon structural information obtained from a long-exposure-time image, (b) scaling instructions that, when executed by the processor, scale at least one of the short-exposure-time image and the long-exposure-time image to place the short-exposure-time image and the long-exposure-time image on a common radiance scale, (c) merging instructions that, when executed by the processor, merge the short-exposure-time image with the long-exposure-time image to generate the HDR image, and (d) control instructions that, when executed by the processor, control the processor to (i) retrieve the short-exposure-time image and the long-exposure-time image and (ii) execute, in the following order, the denoising instructions, the scaling instructions, and the merging instructions.

DESCRIPTION OF EXAMPLE EMBODIMENTS

Figure 1:
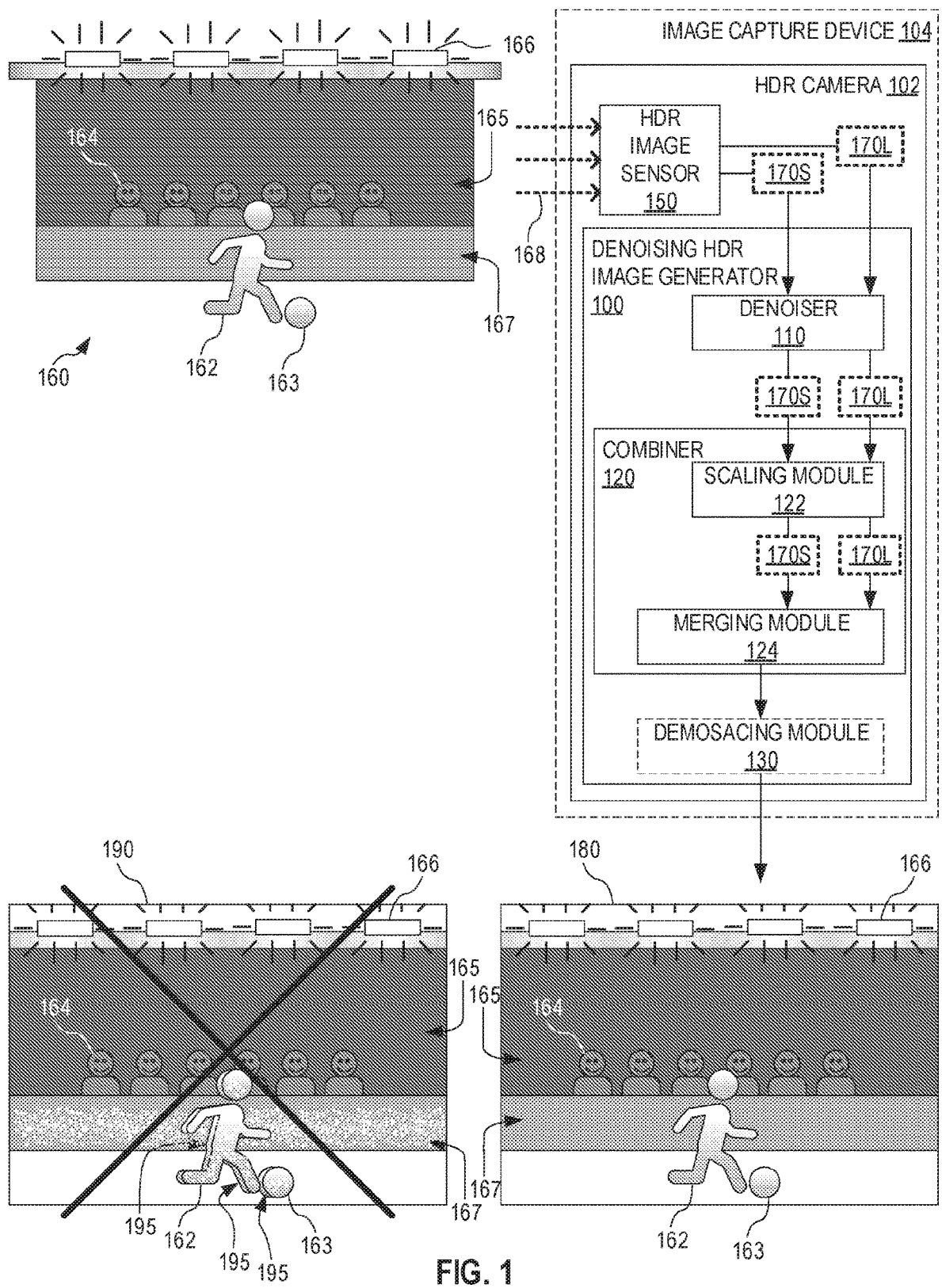
FIG. 1 illustrates a denoising high-dynamic-range (HDR) camera for generating an HDR image with pre-combination denoising, according to an embodiment.

FIG. 1 illustrates one denoising high-dynamic-range (HDR) camera 102 for generating an HDR image 180 with pre-combination denoising. HDR camera 102 includes an HDR image sensor 150 and a denoising HDR image generator 100. HDR image sensor 150 is configured to capture a short-exposure-time image 170S and a long-exposure-time image 170L of the same scene, e.g., scene 160 depicted in FIG. 1. HDR image sensor 150 may use temporal or spatial multiplexing to obtain these two images. HDR image sensor 150 may be a color image sensor or a monochrome image sensor. The bit depth of each pixel of HDR image sensor 150 is 8 or 10 bits, for example. Denoising HDR image generator 100 processes short-exposure-time image 170S and long-exposure-time image 170L to generate an HDR image 180.

Denoising HDR image generator 100 included a denoiser 110 and a combiner 120. Denoiser 110 denoises at least one of short-exposure-time image 170S and long-exposure-time image 170L. Combiner 120 combines images 170S and 170L to form HDR image 180. Combiner 120 includes a scaling module 122 and a merging module 124. Scaling module 122 scales at least one of short-exposure-time image 170S and long-exposure-time image 170L to place short-exposure-time image 170S and long-exposure-time image 170L on a common radiance scale. Merging module 124 merges short-exposure-time image 170S and long-exposure-time image 170L to form HDR image 180.

In one embodiment, merging module 124 forms a linear combination of short-exposure-time image 170S and long-exposure-time image 170L with position-dependent combination weights. For example, merging module 124 may assign more weight to short-exposure-time image 170S in brighter regions of the scene, and more weight to long-exposure-time image 170L in dimmer regions of the scene. Merging module 124 may also take into account motion in the scene, during capture of short-exposure-time image 170S and long-exposure-time image 170L, and reduce the weight of long-exposure-time image 170S in regions of the scene affected by motion.

Denoising HDR image generator 100 is configured to apply denoiser 110 before combiner 120, so as to denoise short-exposure-time image 170S and/or long-exposure-time image 170L before combination thereof to form HDR image 180. As a result, short-exposure-time image 170S and/or long-exposure-time image 170L are denoised before scaling of short-exposure-time image 170S and long-exposure-time image 170L to a common radiance scale. Denoising of short-exposure-time image 170S before scaling may prevent undesirable up-scaling of the noise in exposure-time image 170S, as compared to the noise in long-exposure-time image 170L. Furthermore, the noise properties may be better understood for the individual images 170S and 170L than for a combination thereof. Better understanding of the noise properties is helpful for denoising.

Herein, "denoising" refers to manipulation of image data that results in improved noise properties of the resulting HDR image, e.g., HDR image 180. Thus, "denoising" of short-exposure-time image 170S or long-exposure-time image 170L is not necessarily synonymous with noise reduction in short-exposure-time image 170S or long-exposure-time image 170L, respectively. In some instances, denoising of image 170S or 170L reduces the noise level therein. However, in other instances, denoising of image 170S or 170L adds noise to the image in a manner that makes HDR image 180 appear less noisy.

An additional advantage of performing the denoising before combination is that information from one of images 170S and 170L may be used to guide the denoising of the other one of images 170S and 170L. This would not be possible after image combination.

In the example use scenario depicted in FIG. 1, HDR image sensor 150 receives light 168 from a scene 160. It is understood that HDR camera 102 may include a lens or imaging objective, not shown in FIG. 1 for clarity of illustration, to form an image of scene 160 on HDR image sensor 150. Scene 160 has bright areas (e.g., stadium lights 166), dark areas (e.g., spectator area 165 and spectators 164 not lit by stadium lights 166), and moderately lit areas (e.g., wall 167). Scene 160 also includes moving objects, namely soccer player 162 and ball 163. Denoising HDR image generator 100 processes short-exposure-time image 170S and long-exposure-time image 170L, to generate HDR image 180 accurately depicting, e.g., both bright stadium lights 166 and spectators 164 in the unlit spectator area 165. Before combiner 120 combines short-exposure-time image 170S and long-exposure-time image 170L, denoiser 110 denoises short-exposure-time image 170S and long-exposure-time image 170L (or at least one of them). Denoiser 110 thereby prevents or reduces scaling-up of undesirable noise by scaling module 122, so as to produce HDR image 180 with little or minimal noise.

In contrast, if denoising was performed after combination of short-exposure-time image 170S and long-exposure-time image 170L by combiner 120, noise in raw short-exposure-time image 170S and raw long-exposure-time image 170L would be scaled by scaling module 122 and merged by merging module 124. After such scaling and merging, it would be far more complex, and likely impossible, to remove noise as cleanly as done by denoising HDR image generator 100. Noise in short-exposure-time image 170S would be scaled up by scaling module 122 and, for example, be visible on wall 167, soccer player 162, and ball 163 as depicted in the alternate HDR image 190. Generally, noise cannot be removed as effectively after combiner 120 as before combiner 120. Noise in raw images, such as short-exposure-time image 170S and long-exposure-time image 170L is better understood than noise in a scaled and merged, and thus heavily processed, image. Thus, the denoising capability of denoising HDR image generator 100 is superior to that of an HDR image generator that applies denoising only after scaling and merging of the raw images. For example, the noise visible on wall 167, soccer player 162, and ball 163 in alternate HDR image 190 is absent in HDR image 180.

In certain embodiments, merging module 124 compensates for motion in the scene, to eliminate or reduce motion artifacts in HDR image 180. For example, as mentioned above, merging module 124 may reduce the weight of long-exposure-time image 170L in regions of the scene affected by motion. As a result, HDR image 180 may show soccer player 162 and ball 163 (moving in scene 160) without motion artifacts. Without such motion compensation, motion-artifacts 195 may, as depicted in alternate HDR image 190, occur at edges of soccer player 162 and ball 163 (commonly known as "ghosting" in the literature). It is understood that some embodiments of denoising HDR image generator 100 do not include motion compensation. However, such embodiments may be best suited for capturing still images of stationary scenes.

In embodiments of HDR camera 102 configured for color imaging, HDR image sensor 150 is a color image sensor, and denoising HDR image generator 100 further includes a demosaicing module 130. In such embodiments, denoiser 110 and combiner 120 denoises and combines short-exposure-time image 170S and long-exposure-time image 170L for each color channel to form a color-specific HDR image for each color channel (e.g., a red HDR image, a green HDR image, and a blue HDR image). Next, demosaicing module 130 demosaics the different color channels, according to the color layout of HDR image sensor 150, to form HDR image 180 with each pixel of HDR image 180 having full color information.

HDR camera 102 may be implemented in an image capture device 104. Image capture device 104 is, for example, a smartphone, a digital single-lens reflex (DSLR) camera, or another handheld device. Without departing from the scope hereof, denoising HDR image generator 100 may be provided as a stand-alone product configured to produce HDR image 180 from short-exposure-time image 170S and long-exposure-time image 170L received from a third-party image sensor.

Denoising HDR image generator 100 may be implemented in the form of a processor and machine-readable instructions, encoded in non-transitory memory, that, upon execution by the processor, process short-exposure-time image 170S and long-exposure-time image 170L from HDR image sensor 150 to generate HDR image 180. Certain embodiments of denoising HDR image generator 100 are provided as machine-readable instructions encoded in non-transitory memory, wherein the machine-readable instructions are configured to cooperate with a processor provided by a third party to process short-exposure-time image 170S and long-exposure-time image 170L from HDR image sensor 150 to generate HDR image 180.

In one use scenario, denoising HDR image generator 100 outputs HDR image 180 to a display, for example a display integrated in image capture device 104 or a display of another device. In another use scenario, denoising HDR image generator 100 outputs HDR image 180 to non-transitory memory. This non-transitory memory may be integrated in HDR camera 102 or image capture device 104, or be implemented in an external storage device. In yet another use scenario, denoising HDR image generator 100 outputs HDR image 180 to an external communication bus (e.g., a network) or an external image processing device (e.g., storage device, a computer, or a display device).

Figure 2:
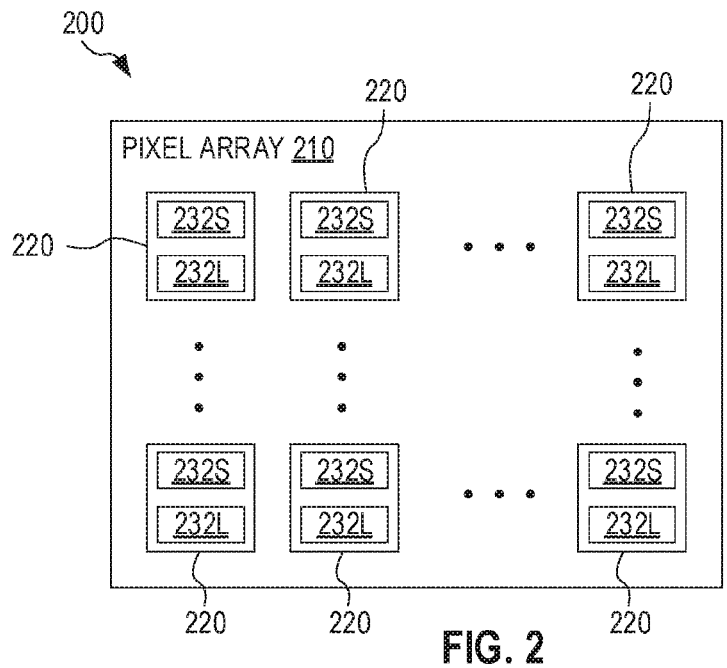
FIG. 2 illustrates a spatially-multiplexed-exposure (SME) HDR image sensor, according to an embodiment.

FIG. 2 illustrates one spatially-multiplexed-exposure (SME) HDR image sensor 200. SME HDR image sensor 200 is an embodiment of HDR image sensor 150. SME HDR image sensor 200 includes a pixel array 210 having an array of identical pixel groups 220. Each pixel group 220 includes at least one short-exposure-time pixel 232S and at least one long-exposure-time pixel 232L. Short-exposure-time pixels 232S collect light during a short exposure time $T_S$, and long-exposure-time pixels 232L collect light during a long exposure time $T_L$, wherein $T_L > T_S$. $T_S$ and $T_L$ may overlap in time, for example with $T_S$ entirely within $T_L$ to minimize the temporal offset between image data generated by short-exposure-time pixels 232S and image data generated by long-exposure-time pixels 232L. A single frame captured by SME HDR image sensor 200 includes both a short-exposure-time image (an example of image 170S) and a long-exposure-time image (an example of image 170L).

The relationship between $T_S$ and $T_L$ may be expressed as $T_L = r \cdot T_S$. In one example, r is in the range between 2 and 16. For computational simplicity, the value of r may be limited to a power of 2, such that scaling by scaling module 122 can be performed by bit shifting of binary numbers encoding the pixel values of denoised images 170S and 170L.

Referring again to FIG. 1, the processing performed by denoising HDR image generator 110 is substantially the same regardless of whether HDR image sensor 150 is an SME HDR image sensor, such as SME HDR image sensor 200, or a temporally multiplexed image sensor. A temporally multiplexed embodiment of HDR image sensor 150 also outputs short-exposure-time image 170S and long-exposure-time image 170L, although these two images are captured sequentially. Greater motion discrepancy may exist for the temporally multiplexed embodiment of HDR image sensor 150, which, at least under certain circumstances, may elevate the importance of motion compensation of merging module 124 in order to produce HDR image 180 free of motion artifacts. Noise characteristics for temporally multiplexed embodiment of HDR image sensor 150 may also be slightly different from the noise characteristics of SMR HDR image sensor 200. Typically, however, no adaptation of denoiser 110 is needed to process images 170S and 170L from a temporally multiplexed embodiment of image sensor 150 as opposed to from SMR HDR image sensor 200.

Generally, scaling module 122 scales pixel values $S_S$ of short-exposure-time image 170S and pixel values $S_L$ of long-exposure-time image 170L (after denoising) as $S_{S,scaled} = \alpha \cdot r \cdot S_S$ and $S_{L,scaled} = \alpha \cdot S_L$, wherein $\alpha$ is a positive scaling factor that may be one, more than one, or less than one. In the simplest scenario, $\alpha=1$, such that scaling module 122 scales short-exposure-time image 170S to the radiance scale of long-exposure-time image 170L, according to the expression $S_{S,scaled} = r \cdot S_S$, while leaving $S_L$ as is. Regardless of the value of $\alpha$, any noise component in short-exposure-time image 170S is amplified by the factor r, relative to pixel values $S_L$ of long exposure time image 170L. This highlights a significant advantage of denoising before scaling. Denoiser 110 is capable of minimizing noise in short-exposure-time image 170S prior to scaling, and potentially resulting noise amplification, by scaling module 122.

Figure 3:
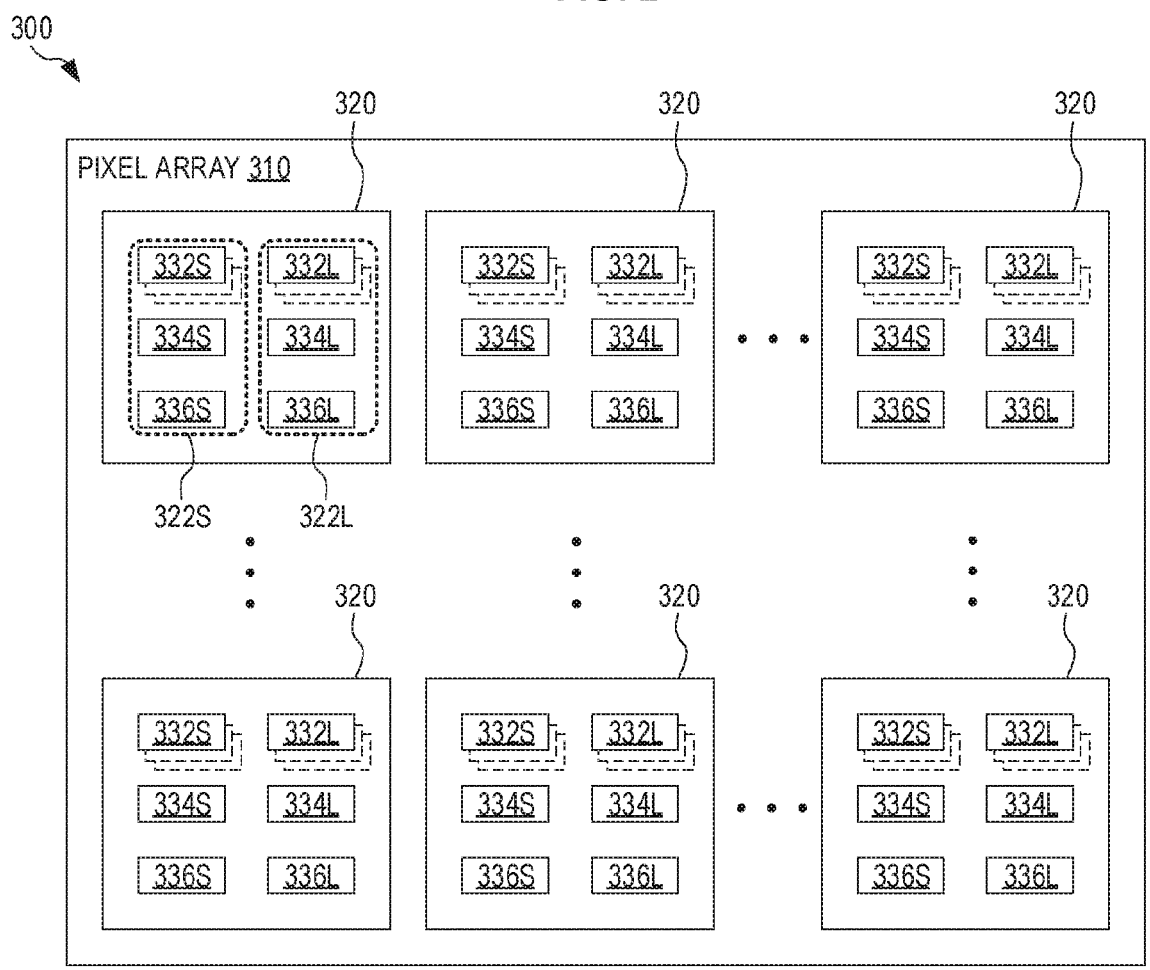
FIG. 3 illustrates a color SME HDR image sensor, according to an embodiment.
Figure 4:
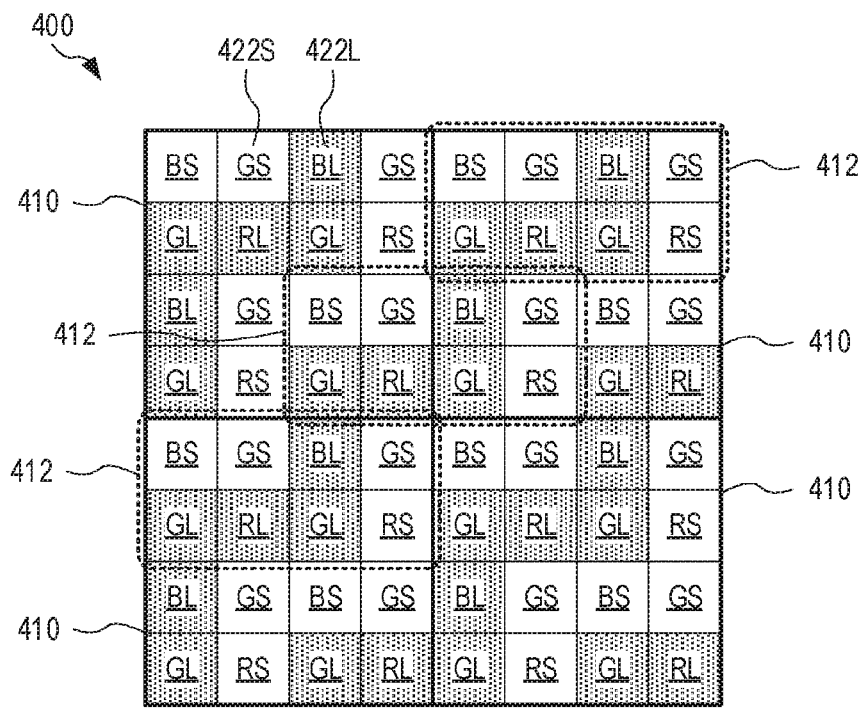
FIG. 4 illustrates a zig-zag HDR color image sensor, according to an embodiment.
Figure 5:
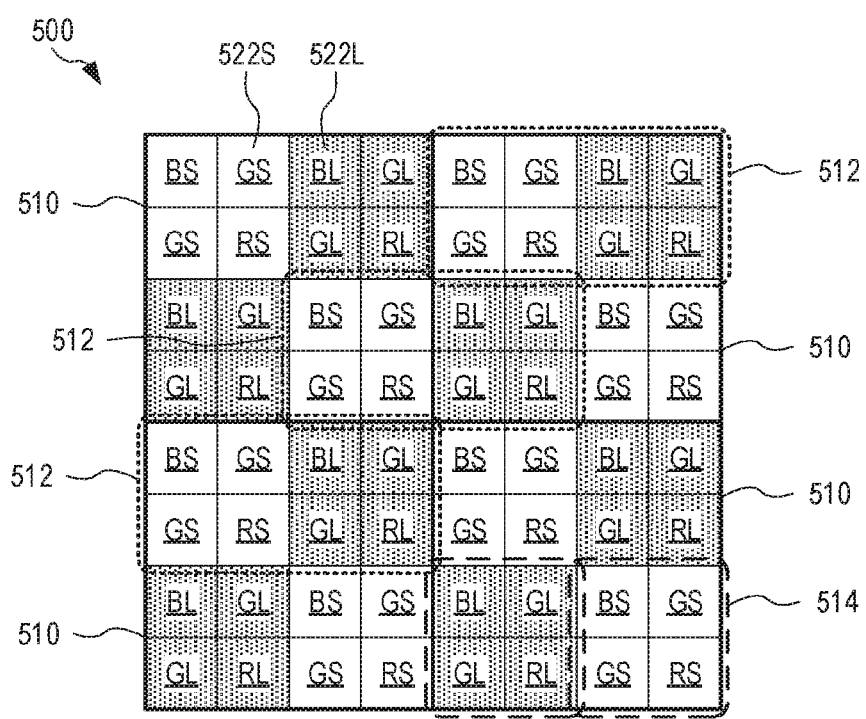
FIG. 5 illustrates an extended-Bayer HDR color image sensor, according to an embodiment.

For each pixel in HDR image 180, merging module 124 computes the pixel value as $S_{HDR} = (1-f) \cdot S_{L,scaled} + f \cdot S_{S,scaled}$, wherein $f$ depends on the pixel location and $0 \le f \le 1$. It is understood that scaling module 122 and merging module 124 may be integrated with each other, such that combiner 120 determines the pixel value of each pixel of HDR image 180 as $S_{HDR} = (1-f) \cdot \alpha \cdot S_L + f \cdot \alpha \cdot r \cdot S_S$. For embodiments of SME HDR image sensor 200 containing multiple color channels, the above expressions for $S_{HDR}$ pertain to each color channel separately. FIGS. 3-5, discussed below, show such embodiments of SME HDR image sensor 200.

FIG. 3 illustrates one color SME HDR image sensor 300. Color SME HDR image sensor 300 is an embodiment of SME HDR image sensor 200 having multiple color channels. Color SME HDR image sensor 300 is depicted in FIG. 3 as having three color channels, but may have two, four, or more color channels without departing from the scope hereof. Color SME HDR image sensor 300 includes a pixel array 310 having an array of identical pixel groups 320. Each pixel group 320 includes short-exposure-time pixels 322S and long-exposure-time pixels 322S, examples of short-exposure-time pixels 232S and long-exposure-time pixels 232L. Short-exposure-time pixels 322S include pixels 332S, 334S, and 336S, sensitive to light of a first, second, and third color, respectively. Similarly, long-exposure-time pixels 322L include pixels 332L, 334L, and 336L, sensitive to light of the first, second, and third color, respectively. The first, second, and third colors are, for example, green, red, and blue.

When generated by color SME HDR image sensor 300, each of short-exposure-time image 170S and long-exposure-time image 170L contains three color components: a first color component composed of pixel values of pixels 332S or 332L, a second color component composed of pixel values of pixels 334S or 334L, and a third color component composted of pixel values of pixels 336S or 336L.

Each pixel group 320 may, without departing from the scope hereof, include more than one instance of one or more of sensor pixels 332S, 334S, 336S, 332L, 334L, and 336L. For example, each pixel group 320 may include a plurality of pixels 332S and a plurality of pixels 332L sensitive to the first color. In one implementation, the first color is green.

FIG. 4 illustrates one zig-zag HDR color image sensor 400 Image sensor 400 is an embodiment of color SME HDR image sensor 300. Pixels of image sensor 400 are arranged in square pixel groups 410. It is understood that image sensor 400 may include more pixel groups 410 than depicted in FIG. 4, for example hundreds or thousands of pixel groups 410. Each pixel group 410 includes short-exposure-time pixels 422S (shown with white background in FIG. 4) and long-exposure-time pixels 422L (shown with shaded background in FIG. 4). In each pixel group 410, short-exposure-time pixels 422S includes four pixels "GS" sensitive to green light, two pixels "RS" sensitive to red light, and two pixels "BS" sensitive to blue light, and long-exposure-time pixels 422L includes four pixels "GL" sensitive to green light, two pixels "RL" sensitive to red light, and two pixels "BL" sensitive to blue light. Pixel groups 410 arrange short-exposure-time pixels 422S and long-exposure-time pixels 422L along alternating zig-zag paths (see the white and shaded zig-zag paths in FIG. 4). Alternatively, image sensor 400 may be viewed as containing a plurality of staggered pixel groups 412. Each pixel group 412 is composed of two GS pixels, two GL pixels, one RS pixel, one RL pixel, one BS pixel, and one BL pixel. Each of pixel group 410 and pixel group 412 is an embodiment of pixel group 320.

FIG. 5 illustrates an extended-Bayer HDR color image sensor 500 Image sensor 500 is an embodiment of color SME HDR image sensor 300. Pixels of image sensor 500 are arranged in square pixel groups 510. It is understood that image sensor 500 may include more pixel groups 510 than depicted in FIG. 5, for example an array of hundreds or thousands of pixel groups 510. Each pixel group 510 includes short-exposure-time pixels 522S and long-exposure-time pixels 522L. In each pixel group 510, short-exposure-time pixels 522S includes four pixels "GS" sensitive to green light, two pixels "RS" sensitive to red light, and two pixels "BS" sensitive to blue light, and long-exposure-time pixels 522L includes four pixels "GL" sensitive to green light, two pixels "RL" sensitive to red light, and two pixels "BL" sensitive to blue light. In each pixel group 510, these pixels are arranged in four Bayer-type blocks: two Bayer-type blocks 514 that each has two GS pixels, one RS pixel, and one BS pixel, and two Bayer-type blocks 516 that each has two GL pixels, one RL pixel, and one BL pixel Image sensor 500 may be viewed as containing a plurality of staggered pixel groups 512 that is composed of one Bayer-type block 514 and one Bayer-type block 516.

Figure 6:
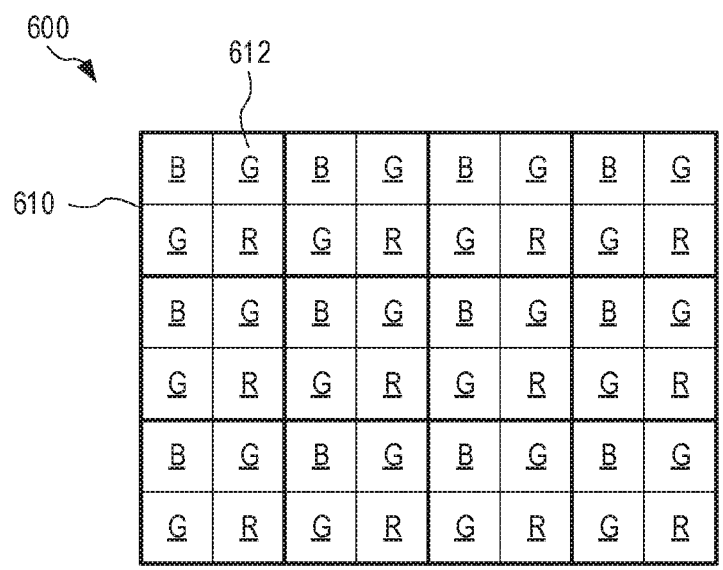
FIG. 6 illustrates a color image sensor configured to operate with the same exposure time for all its pixels, according to an embodiment.

FIG. 6 illustrates one color image sensor 600 configured to operate with the same exposure time for all its pixels 612. The exposure time of color image sensor 600 is adjustable. Color image sensor 600 may therefore be used as a color HDR image sensor by capturing pairs of frames, wherein each pair consists of one frame captured at a short exposure time and another frame captured at a long exposure time. Color image sensor 600 therefore represents a temporally multiplexed embodiment of HDR image sensor 150.

Color image sensor is of the Bayer type and includes an array of identical pixel groups 610. Each pixel group 610 includes a plurality of pixels 612, specifically two pixels "G" sensitive to green light, one pixel "R" sensitive to red light, and one pixel "B" sensitive to blue light.

Figure 7:
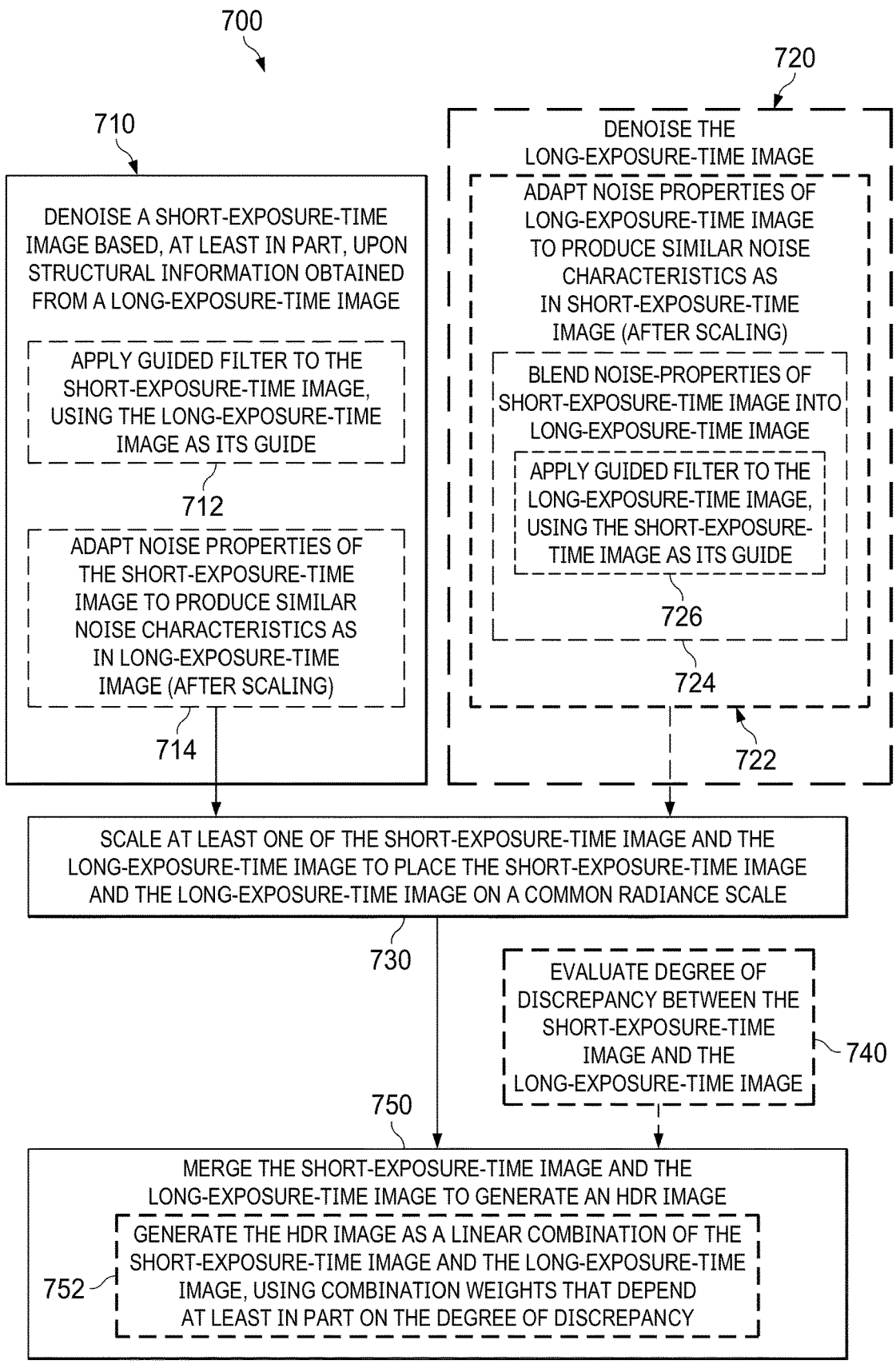
FIG. 7 illustrates a method for generating an HDR image with pre-combination denoising, according to an embodiment.

FIG. 7 illustrates one method 700 for generating an HDR image with pre-combination denoising. Method 700 may be performed by denoising HDR image generator 100. Method 700 includes steps 710, 730, and 750, which may be performed by denoiser 110, scaling module 122, and merging module 124, respectively. In the following, method 700 is discussed in the context of monochrome HDR imaging, that is, processing of only a single color channel. However, method 700 is readily extended to color HDR image, for example as discussed below in reference to FIGS. 8 and 9.

Step 710 denoises a short-exposure-time image based, at least in part, upon information obtained from a long-exposure-time image. In one example of step 710, denoiser 110 denoises short-exposure-time image 170S based, at least in part, upon information obtained from long-exposure-time image 170L. Step 710 spatially filters the short-exposure-time image to remove noise therefrom. Since, the long-exposure-time image usually contains more reliable information about local edges and image structure, structural information from the long-exposure-time image may help uncover scene-based, as opposed to noise-based, structure in the short-exposure-time image. For example, the long exposure-time image may be used to adjust the strength of spatial filtering applied to the short-exposure-time image to allow stronger filtering on dark regions and less filtering on brighter regions, while preserving edge information in the long-exposure-time image.

Step 710 may include a step 712. Step 712 applies a guided filter to the short-exposure-time image, e.g., short-exposure-time image 170S. The guided filter uses the long-exposure-time image, e.g., long-exposure-time image 170L, as its guide. At least because the guided filter uses position sensitive information (the long-exposure-time image) as its guide, the guided filter is position sensitive.

The guided filter of step 712 is, for example, a joint guided filter or a joint bilateral filter, or a different type of guided filter known in the art. Joint guided filters and joint bilateral filters are disclosed, for example, in (i) He et al., "Guided Image Filtering", IEEE Transactions on Pattern Analysis and Machine Intelligence, Vol. 35, Issue 6, pp.

1397-1409, 2012., (ii) He et al., "Guided Image Filtering", In: Daniilidis K., Maragos P., Paragios N. (eds) Computer Vision—ECCV 2010. ECCV 2010. Lecture Notes in Computer Science, vol 6311. Springer, Berlin, Heidelberg, and (iii) Kopf et al., "Joint bilateral upsampling", ACM Trans. Graph. 26, 3, Article 96 (July 2007). Each of these references is incorporated herein by reference in its entirety.

In an embodiment, the guided filter of step 712 utilizes a filter kernel W ($I_L$), wherein $I_L$ is the long-exposure-time image, such that the pixel value of the i'th pixel in the denoised short-exposure-time image may be expressed as $S'_{S,i} = \sum_j W_{ij}(I_L) \cdot S_{S,j}$, wherein the sum runs over all pixels within a corresponding local region of the long-exposure-time image defined by the kernel $W(I_L)$. The exact form of $W(I_L)$ depends on the filter used. For both the joint guided filter and the joint bilateral filter, the form of $W(I_L)$ is such that the pixel value of the i'th pixel in the denoised short-exposure-time image may be expressed as $S'_{S,i} = a \cdot S_{L,i} + b$, wherein the coefficients a and b depend on the pixel values $S_{S,k}$ in a local region of the short-exposure-time image at the i'th pixel. Thus, the image data of the original short-exposure-time image is embedded in coefficients a and b. Each of coefficients a and b is position sensitive. In other words, in this embodiment of the guided filter, the pixel value of the i'th pixel in the denoised short-exposure-time image is determined as a linear function of the corresponding pixel value in the long-exposure-time image (i.e. the guidance image for the filter) in the local region of the short-exposure-time image at the i'th pixel.

The short-exposure-time image may be divided into a number of local regions, each comprising a given number of pixels. The coefficients a and b may be determined by minimizing a cost function in each one of those local regions. For example, the cost function may be based on a difference between the pixel value of the i'th pixel in the denoised short-exposure-time image $S'_{S,i}$, and the corresponding pixel value in the long-exposure-time image $S_{L,i}$. The coefficients a and b may be determined by minimizing such difference. However, other cost functions suitable for the specific implementation can be contemplated and minimized.

In other words, in this embodiment of the guided filter, it is assumed that a local linear model can be used to relate the filter output to the guidance image in each local region of the image. The coefficients a and b are linearly relating the filter output to the guidance image. The coefficients a and b vary spatially between each local region of the short-exposure-time image. The coefficients a and b depend on the pixel values of the local region for which they are determined. For example, each of the coefficient a and b can be determined as a mean value for each local region over the given number of pixels for that region.

Step 730 scales at least one of the short-exposure-time image and the long-exposure-time image to place the short-exposure-time image and the long-exposure-time image on a common radiance scale. In one example of step 730, scaling module 122 scales at least one of short-exposure-time image 170S and long-exposure-time image 170L to place short-exposure-time image 170S and long-exposure-time image 170L on a common radiance scale, as discussed above in reference to FIG. 1. Step 730 is performed after step 710.

Step 750 is performed after step 730 and merges the short-exposure-time image and the long-exposure-time image to generate an HDR image. In one example of step 750, merging module 124 merges short-exposure-time image 170S and long-exposure-time image 170L to form HDR image 180. Step 750 may compute each pixel value of the HDR image as $S_{HDR} = (1 - f(S_{S,scaled}, S_{L,scaled})) \cdot S_{L,scaled} + f(S_{S,scaled}, S_{L,scaled}) \cdot S_{S,scaled}$, wherein $f(S_{S,scaled}, S_{L,scaled})$ is a function of the pixel values $S_{S,scaled}$ and $S_{L,scaled}$ of the scaled version of the short-exposure-time image and the long-exposure-time image. $f(S_{S,scaled}, S_{L,scaled})$ is configured to favor the long-exposure-time image for dim regions of the scene and favor the short-exposure-time image for bright regions of the scene. The function $f$ may, alternatively, be a function of the pixel values $S'_S$ and $S'_L$ of the short-exposure-time image and the long-exposure-time image, respectively, after denoising but before scaling. In either case, the function $f$ benefits from the short-exposure-time image and the long-exposure-time image having been denoised. Greater levels of noise may propagate into the function $f$ and lead to discontinuities (appearing in the HDR image as noise) simply because the combination weights become spatially noise functions of position.

One embodiment of method 700 is adapted to compensate for motion in the merging process. This embodiment of method 700 further includes a step 740, and step 750 of this embodiment includes a step 752. Step 740 evaluates the degree of discrepancy between the short-exposure-time image and the long-exposure-time image. In one example of step 740, combiner 120 compares short-exposure-time image 170S and long-exposure-time image 170L (before denoising by denoiser 110, between denoising by denoiser 110 and scaling by scaling module 122, or after scaling by scaling module 122) to evaluate discrepancies therebetween. Step 740 may produce a disparity parameter D indicating the degree of discrepancy between the short-exposure-time image and the long-exposure-time image. Discrepancy is, for example, caused by motion and/or noise. Disparity parameter D is position sensitive.

Step 752 generates the HDR image as a linear combination of the short-exposure-time image and the long-exposure-time image, using combination weights that depend at least partly on the degree of discrepancy found in step 740. For example, step 752 may compute each pixel value of the HDR image as $S_{HDR} = (1 - f_m(D, S_{S,scaled}, S_{L,scaled})) \cdot S_{L,scaled} + f_m(D, S_{S,scaled}, S_{L,scaled}) \cdot S_{S,scaled}$, wherein $f_m(D, S_{S,scaled}, S_{L,scaled})$ is a function of the disparity parameter D as well as the pixel values $S_{S,scaled}$ and $S_{L,scaled}$ of the scaled version of the short-exposure-time image and the long-exposure-time image. $f_m(D, S_{S,scaled}, S_{L,scaled})$ is an embodiment of $f(S_{S,scaled}, S_{L,scaled})$ that further reduces weight of the long-exposure-time image when the disparity parameter is high. The function $f_m$ may, alternatively, be a function of the pixel values $S'_S$ and $S'_L$ of the short-exposure-time image and the long-exposure-time image, respectively, after denoising but before scaling. In either case, the function $f_m$ benefits from the short-exposure-time image and the long-exposure-time image having been denoised.

Method 700 may also include a step 720 of denoising the long-exposure-time image. Step 720 is performed before step 730. In one example of step 720, denoiser 110 denoises long-exposure-time image 170L. As compared to residual noise in the denoised short-exposure-time image produced in step 710, residual the denoised long-exposure-time image produced in step 720 is not scaled up in the subsequent scaling step 730. Thus, removal of noise from the long-exposure-time image may be less critical than removal of noise from the short-exposure-time image. Since the denoising of the short-exposure-time image in step 710 may not be perfect, the short-exposure-time image may have residual noise. Such residual noise is scaled up in step 730, as compared to any noise in the long-exposure-time image. As a result, the noise level in pixel values $S_{S,scaled}$ may be generally higher than the noise level in pixel values $S_{L,scaled}$. In regions of the HDR image, generated in step 750, where the relative weights of the short-exposure-time image and the long-exposure-time image change, e.g., the function ƒ changes rapidly with position, any significant difference in the noise level of the short-exposure-time image and the long-exposure-time image will lead to spatial discontinuities in the local HDR image structure. These spatial discontinuities will appear to a viewer as noise step in the HDR image.

To reduce such spatial discontinuities, step 720 may include a step 722 of adapting the noise properties of the scaled long-exposure-time image (e.g., image 170L after step 730) to produce similar noise characteristics as in the scaled short-exposure-time image (e.g., image 170S after step 730). Step 722 may include a step 724 of blending noise-properties of the short-exposure-time image into the long-exposure-time image. For example, step 724 may add noise to long-exposure-time image 170L such that the noise-level in pixel values $S_{L,scaled}$ is similar to the noise level in pixel values $S_{S,scaled}$ at the same locations. In one embodiment, step 724 includes a step 726 that applies a guided filter to the long-exposure-time image, using the short-exposure-time image as its guide.

Step 726 is similar to step 712, except with the roles of the short-exposure-time image and the long-exposure-time image switched. In an embodiment, step 726 may utilize a guided filter similar to any one of those discussed above in reference to step 712. The guided filter of step 726 utilizes a filter kernel $K(I_S)$, wherein $I_S$ is the short-exposure-time image, such that the pixel value of the i'th pixel in the denoised long-exposure-time image may be expressed as $S'_{L,i}=\Sigma_j K_{ij}(I_S) \cdot S_{L,j}$, wherein the sum runs over all pixels within a corresponding local region of the short-exposure-time image defined by the kernel $K(I_S)$. The exact form of $K(I_S)$ depends on the filter used. For both the joint guided filter and the joint bilateral filter, the form of $K(I_S)$ is such that the pixel value of the i'th pixel in the denoised long-exposure-time image may be expressed as $S'_{L,i}=c \cdot S_{S,i}+d$, wherein the coefficients c and d depend on the pixel values $S_{L,k}$ in a local region of the long-exposure-time image at the i'th pixel. Thus, the image data of the original long-exposure-time image is embedded in coefficients c and d. Each of coefficients c and d is position sensitive. The coefficients c and d may be determined in the same way as described with reference to step 712, except that in this embodiment of the guided filter, the short-exposure-time image is used as guide for denoising the long-exposure-time image. Thus similarly to the guided filter described with reference to step 712, the guided filter utilizing the short-exposure-time image as its guide may comprise determining a pixel value in the denoised long-exposure-time image as a linear function of a corresponding pixel value in the short-exposure-time image in a local region of the long-exposure-time image at said pixel value in the denoised long-exposure-time image.

Also in this embodiment of the guided filter, it is assumed that a local linear model can be used to relate the filter output to the guidance image in each local region of the image. The coefficients c and d are linearly relating the filter output to the guidance image (the short-exposure-time image in this case). The coefficients c and d vary spatially between each local region of the long-exposure-time image. The coefficients c and d depend on the pixel values of the local region for which they are determined. For example, each of the coefficient c and d can be determined as a mean value for each local region over the given number of pixels for that region.

To further control the degree to which noise of the short-exposure-time image is blended into the long-exposure-time image, the spatial size of the filter kernel $K(I_S)$ may be adjusted. A large kernel will blend more noise into the long-exposure-time image, and a small kernel will blend less noise into the long-exposure-time image. With a kernel size of a single pixel, no noise is blended into the long-exposure-time image. The size of kernel $K(I_S)$ may be position sensitive, such that the degree to which noise is blended into the long-exposure-time image is position sensitive.

In a similar manner to step 722, step 710 may include a step 714 that adapts the noise properties of the short-exposure-time image (e.g., image 170S after step 730) to produce similar noise characteristics as in the long-exposure-time image (e.g., image 170S after step 730).

Without departing from the scope hereof, method 700 may integrate steps 730 and 750, in manner similar to the integration of scaling module 122 and merging module 124 discussed above in reference to FIG. 1.

Figure 8:
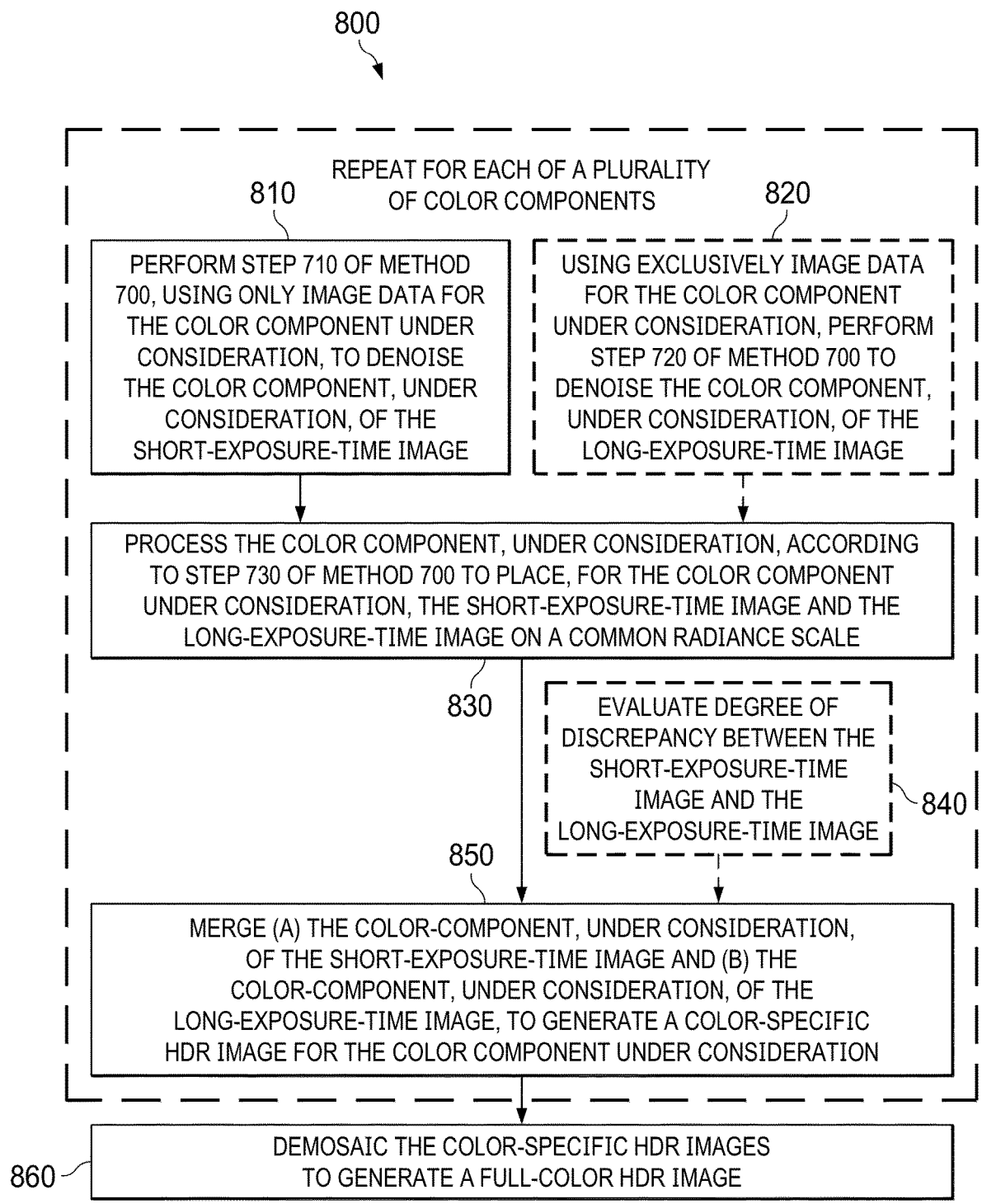
FIG. 8 illustrates a method for generating a denoised color HDR image from a short-exposure-time color image and a long-exposure-time color image, according to an embodiment.

FIG. 8 illustrates one method 800 for generating a denoised color HDR image from a short-exposure-time color image and a long-exposure-time color image. The short-exposure-time color image and the long-exposure-time color image includes the same plurality of color components. Method 800 may be performed by denoising HDR image generator 100, for example based upon images 170S and 170L received from color SME HDR image sensor 300 or color image sensor 600. Method 800 is an extension of method 700. Method 800 includes steps 810, 830, 850, and 860. Steps 810, 830, and 850 are repeated for each color component of the short-exposure-time and long-exposure time color images. Step 830 is performed after step 810, and step 850 is performed after step 830.

Step 810 performs step 710 of method 700, using only image data for the color component under consideration, to denoise that color component of the short-exposure-time image. In one example of step 810, denoiser 110 denoises one color component (e.g., red, green, or blue) of a short-exposure-time color image received from color SME HDR image sensor 300 or color image sensor 600. In embodiments of step 810 implementing step 712 and/or step 714, the long-exposure-time image data used in steps 712 and 714 is from the same color component as the color component being processed for the short-exposure-time image. For example, when step 810 processes the red color component of a short-exposure-time color image, the guided filter of step 712 implemented in step 810 uses the red color component of the long-exposure-time color image as its guide.

Step 830 processes, according to step 730 of method 700, the color component, under consideration, of the short-exposure-time and long-exposure-time color images, so as to place the short-exposure-time and long-exposure-time color images on a common radiance scale. In one example of step 830, scaling module 122 scales one color-component of at least one of images 170S and 170L to place that color component of images 170S and 170L on a common radiance scale.

Step 850 merges (a) the color component, under consideration, of the short-exposure-time color image and (b) the same color component of the long-exposure-time color image, to generate a color-specific HDR image for that color component. In one example of step 850, merging module 124 merges one color component (e.g., red, green, or blue)

of short-exposure-time image 170S with the same color-component of long-exposure-time image 170L, to generate a color-specific HDR image for that color component.

Method 800 may further include a step 820 that denoises the color component, under consideration, of the long-exposure-time color image. Step 820 performs step 720 of method 700 to denoise the color component, under consideration, of the long-exposure-time color image using exclusively image data for that color component. Thus, embodiments of step 820 implementing one or more of steps 722, 724, and 726, considers only that single color component. Step 820 is performed before step 830. In one example of step 820, denoiser 110 denoises one color component (e.g., red, green, or blue) of a long-exposure-time color image received from color SME HDR image sensor 300 or color image sensor 600.

In one embodiment, configured to compensate for motion, method 800 further includes a step 840 performed before step 850, and step 850 implements step 752. In this embodiment, step 840 evaluates the discrepancy, for the color component under consideration, between the short-exposure-time color image and the long-exposure-time color image. Step 752, as implemented in step 850, takes into account this color-specific discrepancy.

Step 860 demosaics the color-specific HDR images, generated for the plurality of color components in respective executions of step 850, to generate a full-color HDR image. Each pixel in the full-color HDR image contains full color information. In one example of step 860, demosaicing module 130 demosaics a plurality of color-specific HDR images (e.g, red, green, and blue), received from combiner 120, to generate a full-color embodiment of HDR image 180.

Figure 9:
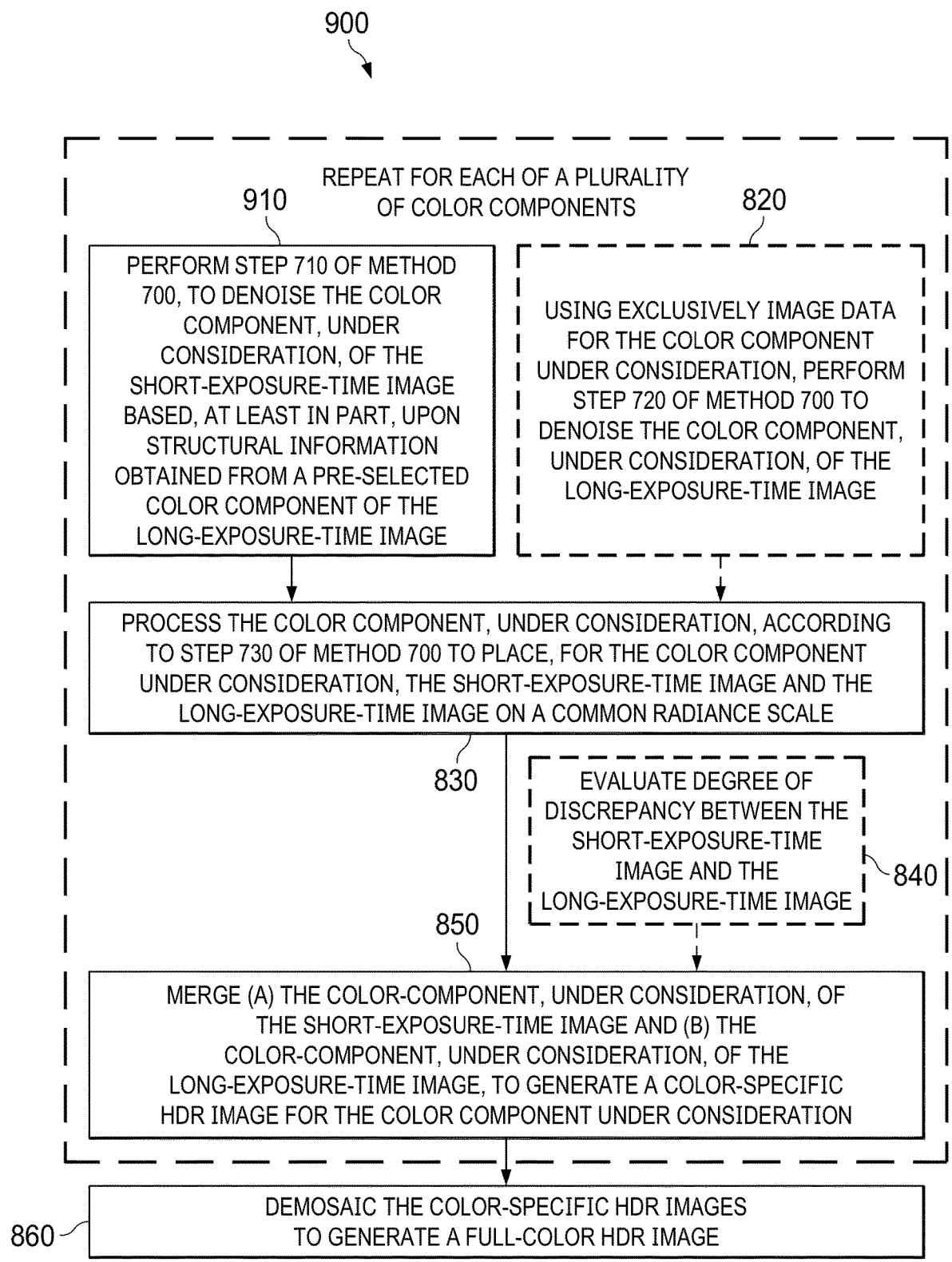
FIG. 9 illustrates another method for generating a denoised color HDR image from a short-exposure-time color image and a long-exposure-time color image, according to an embodiment.

FIG. 9 illustrates another method 900 for generating a denoised color HDR image from a short-exposure-time color image and a long-exposure-time color image. The short-exposure-time color image and the long-exposure-time color image includes the same plurality of color components. Method 800 may be performed by denoising HDR image generator 100, for example based upon images 170S and 170L received from color SME HDR image sensor 300 or color image sensor 600. Method 900 is similar to method 800 except that denoising of each of the plurality of color components of the short-exposure-time image is based, at least in part, upon structural information obtained from a single pre-selected color component of the long-exposure-time color image. For example, method 900 may at least partly base the denoising of each of a red, green, and blue color component of a short-exposure-time image on the green color component of the long-exposure-time image. Method 900 is well-suited for scenarios where one color, for example green, is generally dominant.

As compared to method 800, method 900 replaces step 810 with a step 910. Step 910 performs step 710 of method 700 to denoise the color component, under consideration, of the short-exposure-time image based, at least in part, upon structural information obtained from a pre-selected color component of the long-exposure-time image. In one example of step 910, denoiser 110 denoises one color component of a short-exposure-time color image. Regardless of which color component of the short-exposure-time color image is being considered, denoiser 110 bases the denoising, at least in part, upon a pre-selected color component of the long-exposure-time color image. In embodiments of step 910 implementing step 712 and/or step 714, the long-exposure-time image data used in steps 712 and 714 is from the pre-selected color component regardless of which color component is being processed for the short-exposure-time image. In one example, in the processing of each of a red, green, and blue color component of the short-exposure-time color image, the guided filter of step 712 implemented in step 910 uses the green color component of the long-exposure-time color image as its guide.

Although not shown in FIG. 9, optional step 840 (as implemented in method 900) may evaluate the degree of discrepancy in the color channel associated with the pre-selected color component, and step 852 (as implemented in method 900) may base its motion compensation on the discrepancy in the color channel associated with the pre-selected color component, regardless of which color component is being merged in step 850 (as implemented in method 900).

Figure 10:
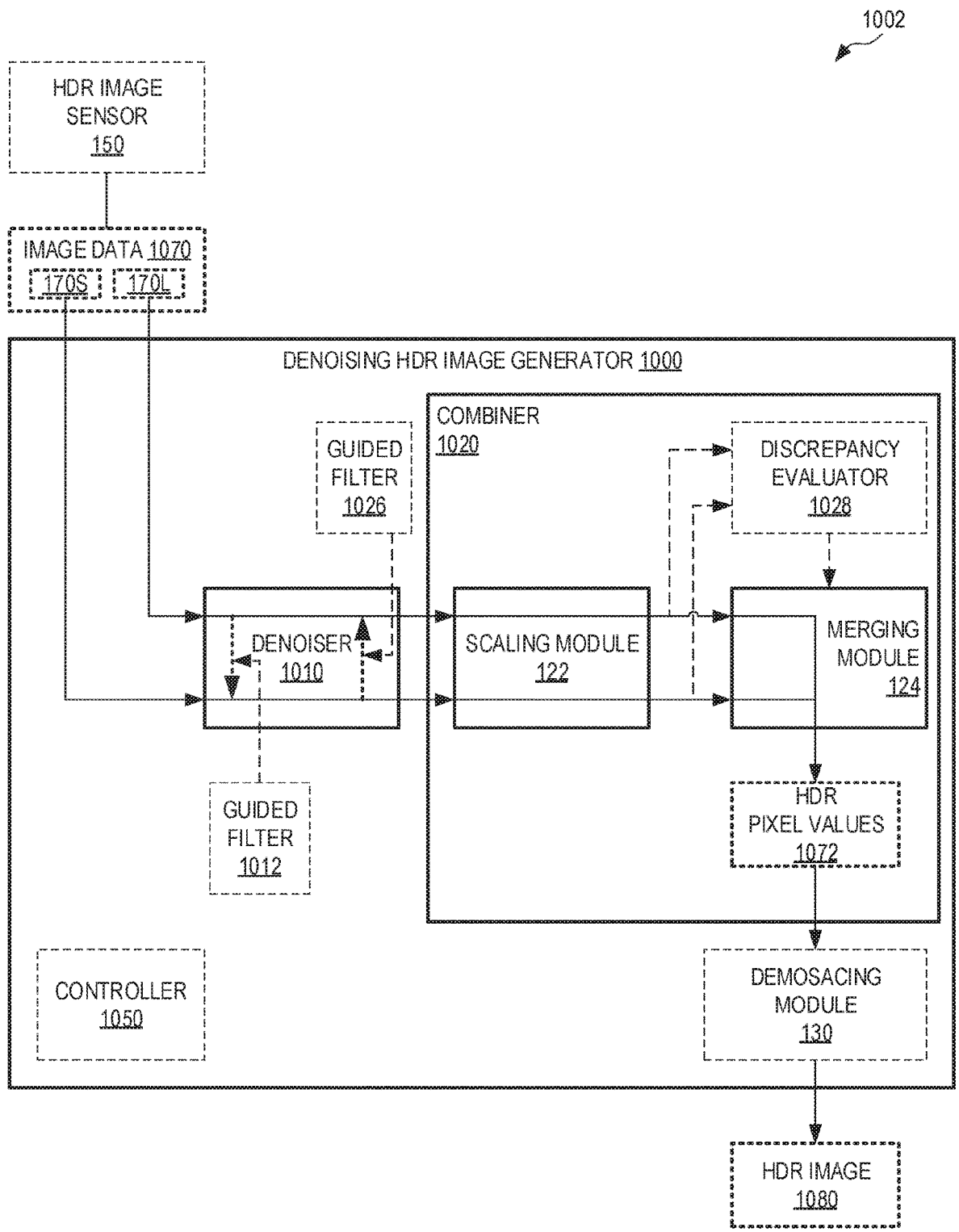
FIG. 10 illustrates a denoising HDR image generator that uses image information from one exposure time to denoise image data of another exposure time, according to an embodiment.

FIG. 10 illustrates one denoising HDR image generator 1000 that uses image information from one exposure time to denoise image data of another exposure time. Denoising HDR image generator 1000 is an embodiment of denoising HDR image generator 100, and may perform method 700, 800, or 900. Denoising HDR image generator 1000 may be coupled with HDR image sensor 150 in an HDR camera 1002. Denoising HDR image generator 1000 includes a denoiser 1010 and a combiner 1020, embodiments of denoiser 110 and a combiner 120, respectively.

In operation, denoiser 1010 receives image data 1070 from HDR image sensor 150. Image data 1070 includes short-exposure-time image 170S and long-exposure-time image 170L. Denoiser 1010 denoises one or both of short-exposure-time image 170S and long-exposure-time image 170L before combination thereof by combiner 1020. Next, combiner 1020 combines short-exposure-time image 170S and long-exposure-time image 170L (at least one of which having been denoised by denoiser 1010) to form an HDR image 1080. HDR image 1080 is an example of HDR image 180.

Denoiser 1010 is configured to (a) utilize information from long-exposure-time image 170L in denoising of short-exposure-time image 170S and/or (b) utilize information from short-exposure-time image 170S in denoising of long-exposure-time image 170L. In one implementation, denoiser 1010 performs an embodiment of step 710 of method 700 (optionally as part of method 800 or 900) that implements step 712 and/or step 714. In this embodiment, denoiser 1010 utilizes information obtained from long-exposure-time image 170L to denoise short-exposure-time image 170S according to step 712 and/or step 714. In another implementation, denoiser performs an embodiment of step 720 (optionally as part of method 800) that implements step 722. In this embodiment, denoiser 1010 utilizes information obtained from short-exposure-time image 170S to denoise long-exposure-time image 170L according to step 722.

Embodiments of denoising HDR image generator 1000 configured to perform step 712 may further include a guided filter 1012 for use by denoiser 1010. Similarly, embodiments of denoising HDR image generator 1000 configured to perform step 726 may further include a guided filter 1026 for use by denoiser 1010.

Combiner 1020 includes scaling module 122 and merging module 124. Combiner 1020 may further include a discrepancy evaluator 1028 configured to perform step 740 or 840. In operation, discrepancy evaluator 1028 processes short-exposure-time image 170S and long-exposure-time image 170L, as scaled by scaling module 122, to determine disparity parameter D discussed above in reference to FIG. 7. Discrepancy evaluator 1028 feed disparity parameter D to merging module 124. Alternatively, discrepancy evaluator 1028 processes short-exposure-time image 170S and long-exposure-time image 170L before scaling by scaling module 122 but after denoising of at least one of these two images by denoiser 1010.

Merging module 124 outputs pixel values 1072. In scenarios where short-exposure-time image 170S and long-exposure-time image 170L contain only a single color component (e.g., are monochrome images), HDR pixel values 1072 constitute the final HDR image 1080 generated by denoising HDR image generator 1000. In scenarios where short-exposure-time image 170S and long-exposure-time image 170L are color images and thus contain a plurality of color components, HDR pixel values 1072 constitute a respective plurality of color-specific HDR images. To generate a final, full-color HDR image 1080 from such a plurality of color-specific HDR images, denoising HDR image generator 1000 may further include demosaicing module 130 to perform step 860 of method 800 or 900.

In certain embodiments, denoising HDR image generator 1000 includes a controller 1050 that controls the flow of image data 1070 through denoising HDR image generator 1000. For example, controller 1050 may, upon receipt of image data 1070 by HDR image generator 1000, send image data 1070 to denoiser 1010 before sending image data 1070, as processed by denoiser 1010, to combiner 1020. When image data 1070 includes several color components, controller 1050 may control the flow of each such color component through denoiser 1010, combiner 1020, and demosaicing module 130 according to method 800 or 900.

Figure 11:
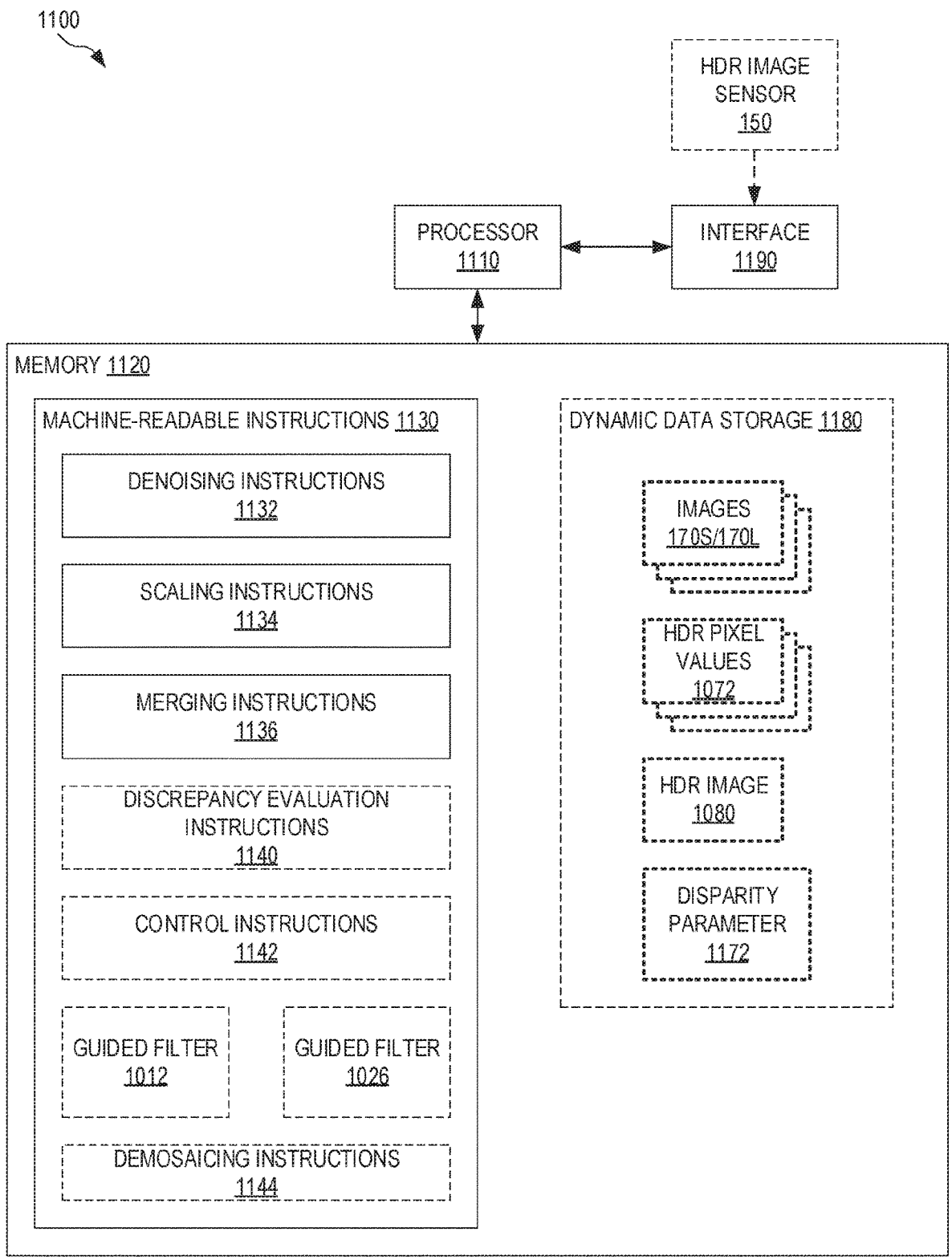
FIG. 11 illustrates a system for generating denoised HDR images, according to an embodiment.

FIG. 11 illustrates one system 1100 for generating denoised HDR images. System 1100 includes a processor 1110, a non-transitory memory 1120, and an interface 1190.

Processor 1110 and memory 1120 (and, in certain embodiments, interface 1190) cooperate to form a computer implementation of denoising HDR image generator 1000. System 1100 may further include HDR image sensor 150, in which case system 1100 is an embodiment of HDR camera 1002.

Memory 1120 includes machine-readable instructions 1130. Machine-readable instructions 1130 may be encoded in a non-volatile portion of memory 1120. Machine-readable instructions 1130 include denoising instructions 1132, scaling instructions 1134, and merging instructions 1136. In one embodiment, memory 1120 may further include a dynamic data storage 1180 configured to store data received via interface 1190 and/or data generated by machine-readable instructions 1130 when executed by processor 1110. In another embodiment, system 1100 does not include memory 1120 but is instead configured to cooperate with an external memory, for example provided by a third party.

Upon execution by processor 1110, denoising instructions 1132 obtains image data 1070 containing short-exposure-time image 170S and long-exposure-time image 170L, and performs step 710 of method 700 (optionally as part of method 800 or 900). Processor 1110 may store raw and denoised short-exposure-time image 170S and long-exposure-time image 170L in dynamic data storage 1180. Upon execution by processor 1110, scaling instructions 1134 perform step 730 of method 700, or step 830 of method 800 or 900, on short-exposure-time image 170S and long-exposure-time image 170L (at least one of which having been denoised). Processor 1110 may store scaled versions of short-exposure-time image 170S and/or long-exposure-time image 170L to dynamic data storage 1180. Upon execution by processor 1110, merging instructions 1136 perform step 750 of method 700, or step 850 of method 800 or 900, to generate HDR pixel values 1072. Processor 1110 may store HDR pixel values 1072 to dynamic data storage 1180. In scenarios where short-exposure-time image 170S and long-exposure-time image 170L are monochrome, processor 1110 may store HDR pixel values 1072 to dynamic data storage 1180 directly as HDR image 1080.

In certain embodiments, machine-readable instructions further include demosaicing instructions 1144 that, when executed by the processor, (a) retrieve HDR pixel values 1072 (forming a plurality of color-specific HDR images), and (b) perform step 860 of method 800 or 900 to generate a full-color HDR image. Processor 1110 may store this full-color HDR image to dynamic data storage 1180 as HDR image 1080 or output the full-color HDR image via interface 1190.

Machine-readable instructions 1130 may further include discrepancy evaluation instructions that, when executed by processor 1110, perform step 740 of method 700, or step 840 of method 800 or 900, to determine disparity parameter D. Processor 1110 may store disparity parameter D to dynamic data storage 1180 as disparity parameter 1172.

In an embodiment, machine-readable instructions 1130 further includes one or both of guided filter 1012 and guided filter 1026. In this embodiment, denoising instructions 1132 is configured to call guided filter 1012 and/or guided filter 1026 when executed by processor 1110.

Optionally, machine-readable instructions 1130 further includes control instructions 1142. Control instructions 1142 cooperate with processor 1110 to form an embodiment of controller 1050. In one scenario, control instructions 1142, when executed by processor 1110, manage the execution of denoising instructions 1132, scaling instructions 1134, and merging instructions 1136 for each of a plurality of color channels of short-exposure-time image 170S and long-exposure-time image 170L prior to execution of demosaicing instructions 1144.

Without departing from the scope hereof, machine-readable instructions 1130 may be provided as a stand-alone software product configured for implementation on a third-party computer that has (a) a non-transitory memory for storage of machine-readable instructions 1130 and (b) a processor for execution of machine-readable instructions 1130.

The above discussion of FIGS. 1-11 has been concerned with generation of HDR images from raw images captured at two different exposure times, a short exposure time and a long exposure time. However, as will be discussed in the following, the systems and methods disclosed in FIGS. 1-11 are readily extended to generation of HDR images from raw images captured at three or more different exposure times.

Figure 12:
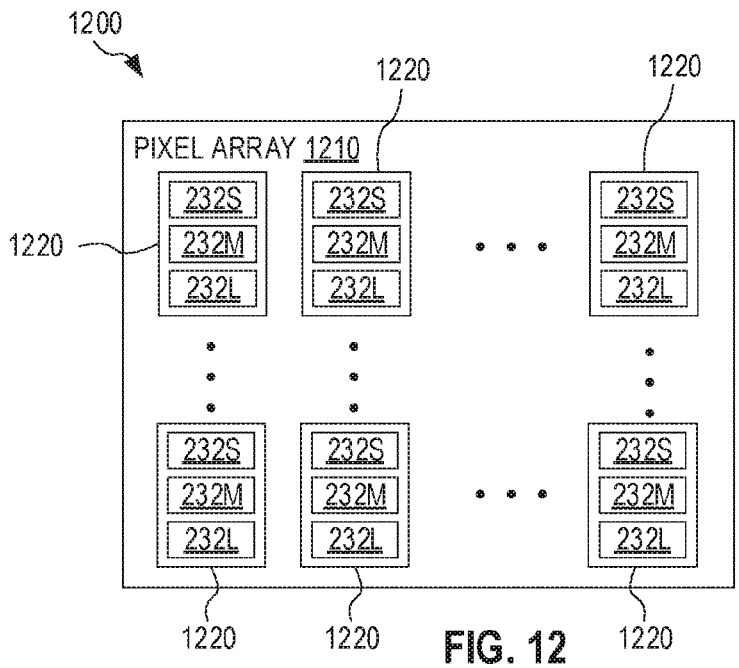
FIG. 12 illustrates a SME HDR image sensor configured to capture image data at three different exposure times, according to an embodiment.

FIG. 12 illustrates one SME HDR image sensor 1200 configured to capture image data at three different exposure times. SME HDR image sensor 1200 is an embodiment of SME HDR image sensor 200 extended to three different exposure times, a short exposure time $T_S$, a medium exposure time $T_M$, and a long exposure time $T_L$, wherein $T_S < T_M < T_L$.

SME HDR image sensor 1200 includes a pixel array 1210 having an array of identical pixel groups 1220. Each pixel group 1220 includes at least one short-exposure-time pixel 232S, at least one medium-exposure-time pixel 232M, and at least one long-exposure-time pixel 232L. Short-exposure-time pixels 232S collect light during short exposure time $T_S$, medium-exposure-time pixels 232M collect light during medium exposure time $T_M$, and long-exposure-time pixels 232L collect light during long exposure time $T_L$. $T_S$, $T_M$, and $T_L$ may overlap in time, for example with $T_S$ entirely within $T_M$ and $T_M$ entirely within $T_L$ to minimize the temporal offset between image data generated by short-exposure-time pixels 232S, image data generated by medium-exposure-time pixels 232M, and image data generated by long-exposure-time pixels 232L. A single frame captured by SME HDR image sensor 1200 includes a short-exposure-time image (an example of image 170S), a medium-exposure-time image (denoted image 170M), and a long-exposure-time image (an example of image 170L).

SME HDR image sensor 1200 may be readily extended to operate with four or more exposure times. For example, SME HDR image sensor 1200 may be extended to four different exposure times by including, in each pixel group 1220, at least one pixel configured to collect light at an exposure that is different from any one of $T_S$, $T_M$, and $T_L$.

Figure 13:
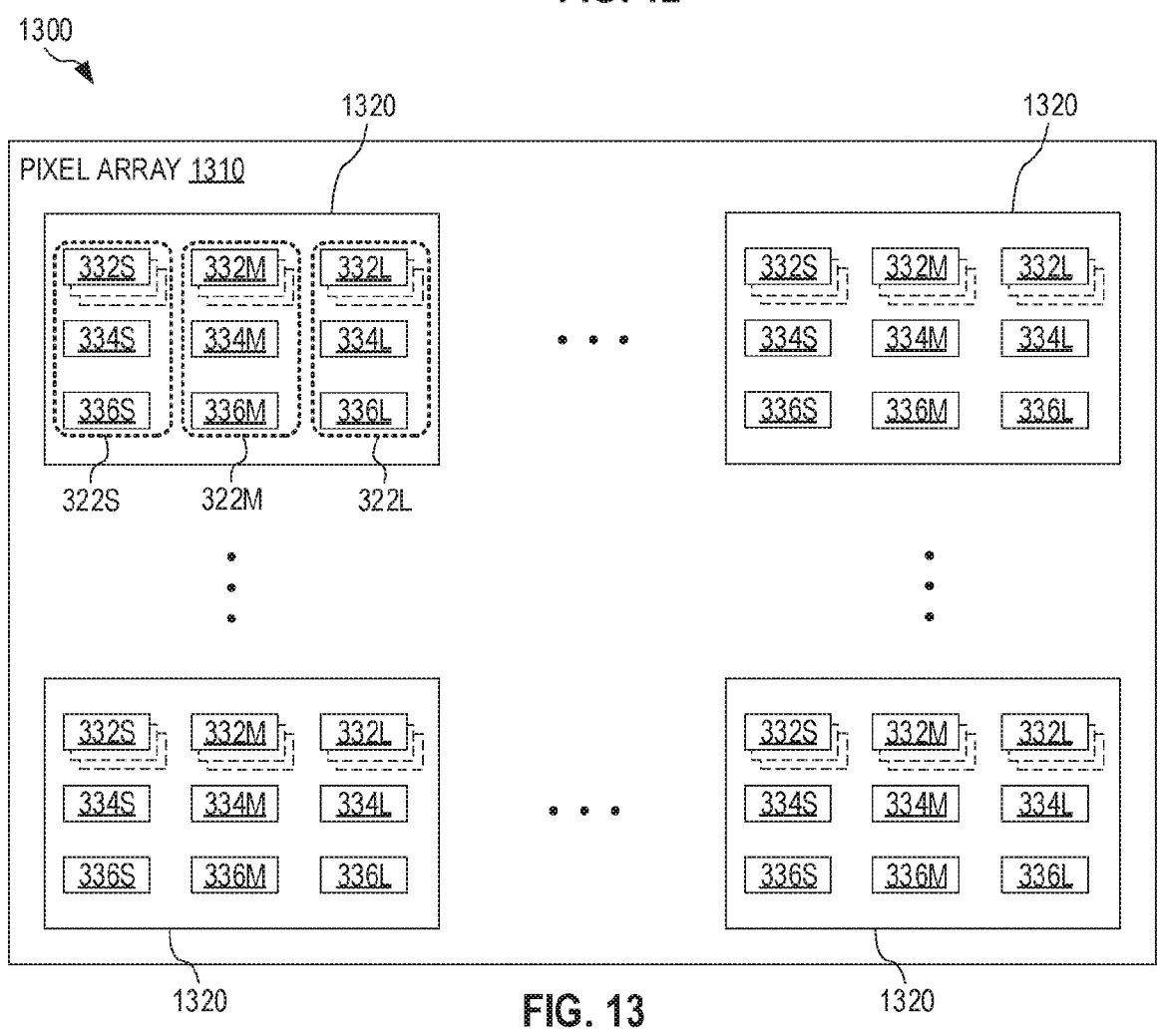
FIG. 13 illustrates a color SME HDR image sensor configured to capture image data at three different exposure times, according to an embodiment.

FIG. 13 illustrates one color SME HDR image sensor 1300 configured to capture image data at three different exposure times. Color SME HDR image sensor 1300 is an embodiment of SME HDR image sensor 1200 having multiple color channels. Color SME HDR image sensor 1300 is depicted in FIG. 4 as having three color channels, but may have two, four, or more color channels without departing from the scope hereof.

Color SME HDR image sensor 1300 includes a pixel array 1310 having an array of identical pixel groups 1320. Each pixel group 1320 includes short-exposure-time pixels 322S, medium-exposure-time pixels 322M, and long-exposure-time pixels 322S. Short-exposure-time pixels 322S are examples of short-exposure-time pixels 232S and include pixels 332S, 334S, and 336S, sensitive to light of a first, second, and third color, respectively. Medium-exposure-time pixels 332M are examples of medium-exposure-time pixels 232M and include pixels 332M, 334M, and 336M, sensitive to light of the first, second, and third color, respectively. Long-exposure-time pixels 322L are examples of long-exposure-time pixels 232L and include pixels 332L, 334L, and 336L, sensitive to light of the first, second, and third color, respectively. The first, second, and third colors are, for example, green, red, and blue.

When generated by color SME HDR image sensor 1300, each of short-exposure-time image 170S, medium-exposure-time image 170M, and long-exposure-time image 170L contains three color components: a first color component composed of pixel values of pixels 332S, 332M, or 332L, a second color component composed of pixel values of pixels 334S, 334M, or 334L, and a third color component composed of pixel values of pixels 336S, 336M, or 336L.

Each pixel group 1320 may, without departing from the scope hereof, include more than one instance of one or more of sensor pixels 332S, 334S, 336S, 332M, 334M, 336M, 332L, 334L, and 336L. For example, each pixel group 1320 may include a plurality of pixels 332S, a plurality of pixels 332M, and a plurality of pixels 332L sensitive to the first color. In one implementation, the first color is green.

Figure 14:
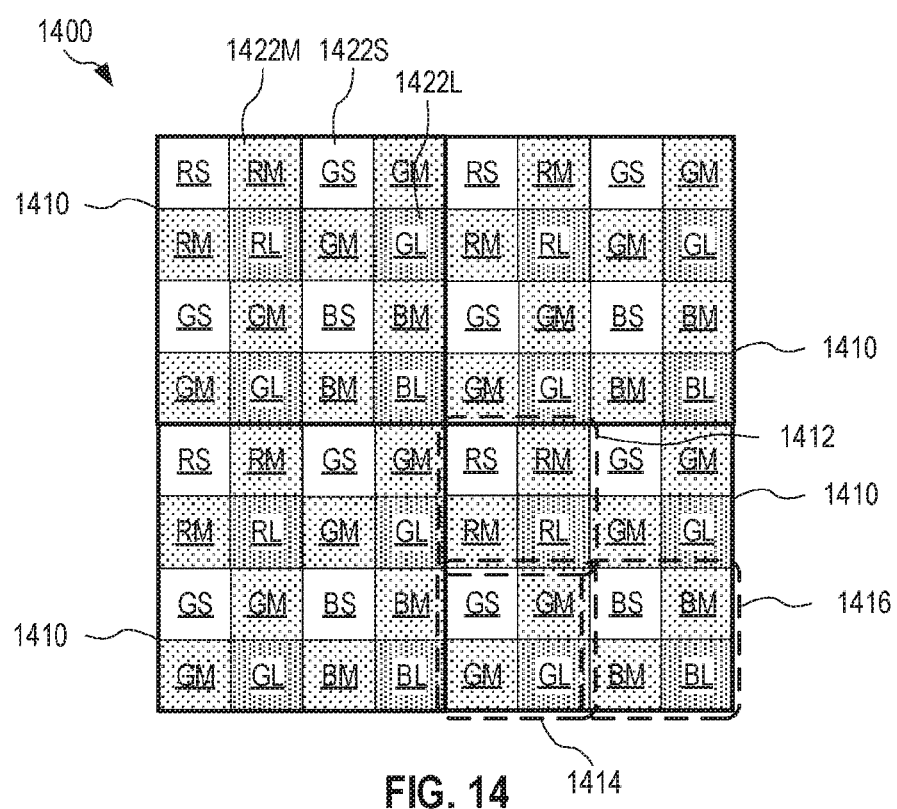
FIG. 14 illustrates a color SME HDR image sensor having its pixels arranged in color-specific quadruplets that each includes pixels sensitive to three different exposure times, according to an embodiment.

FIG. 14 illustrates one color SME HDR image sensor 1400 having its pixels arranged in color-specific quadruplets that each includes pixels sensitive to three different exposure times. Color SME HDR image sensor 1400 is an embodiment of color SME HDR image sensor 300. Color SME HDR image sensor 1400 includes an array of identical square pixel groups 1410. It is understood that color SME HDR image sensor 1400 may include more pixel groups 1410 than depicted in FIG. 14, for example hundreds or thousands of pixel groups 1410. Each pixel group 1410 includes short-exposure-time pixels 1422S (shown with white background in FIG. 14), medium-exposure-time pixels 1422M (shown with light shaded background in FIG. 14), and long-exposure-time pixels 1422L (shown with dark shaded background in FIG. 14). Each pixel group 1410 arranges pixels 1422S, 1422M, and 1422L in color-specific quadruplets. More specifically, each pixel group 1410 includes one quadruplet 1412 sensitive to red light, two quadruplets 1414 sensitive to green light, and one quadruplet 1416 sensitive to blue light. Each quadruplet 1412 is composed of one short-exposure-time pixel "RS", two medium-exposure-time pixels "RM", and one long-exposure-time pixel "RL". Each quadruplet 1414 is composed of one short-exposure-time pixel "GS", two medium-exposure-time pixels "GM", and one long-exposure-time pixel "GL". Each quadruplet 1416 is composed of one short-exposure-time pixel "BS", two medium-exposure-time pixels "BM", and one long-exposure-time pixel "BL". Each pixel group 1410 is an embodiment of pixel group 1320.

Each of SME HDR image sensors 1200, 1300, and 1400 may be implemented in HDR camera 102 as HDR image sensor 150 to generate. Similarly, temporally multiplexed image sensors configured to sequentially capture images at three or more different exposure times may be implemented in HDR camera 102 as HDR image sensor 150. More generally, HDR image sensor 150 may be configured to generate three or more different images of the same scene, captured at three or more different exposure times, respectively. Each of methods 700, 800, and 900 is readily extended to process image data captured at three or more different exposure times.

Figure 15:
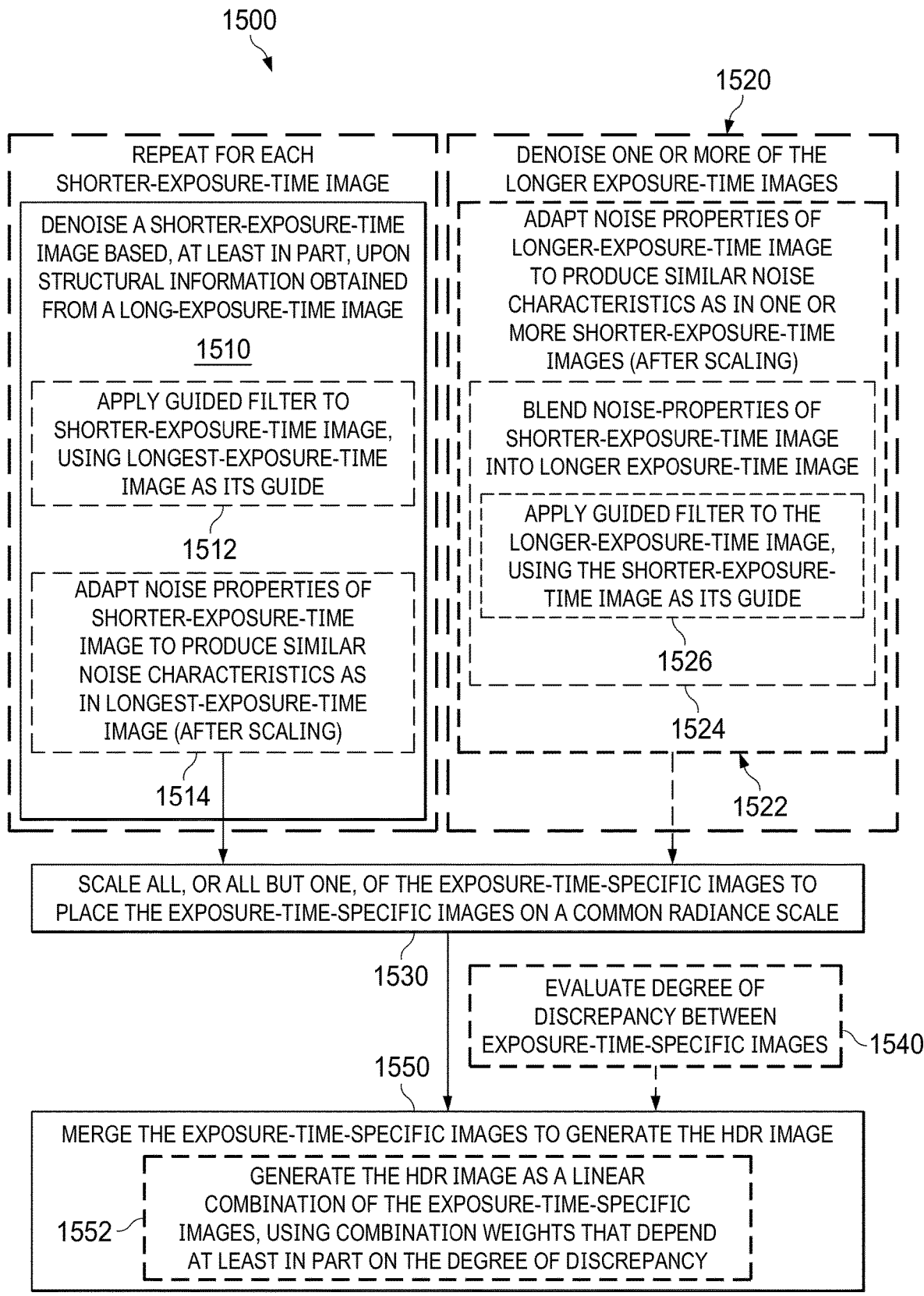
FIG. 15 illustrates a method for generating an HDR image with pre-combination denoising, based upon input images captured at three or more different exposure times, according to an embodiment.

FIG. 15 illustrates one method 1500 for generating an HDR image with pre-combination denoising, based upon input images captured at three or more different exposure times. Method 1500 may be performed by denoising HDR image generator 100. Method 1500 is an extension of method 700 to three or more different exposure times. Each of denoising HDR image generator 100, denoising HDR image generator 1000, and system 1100 may be adapted to perform method 1500.

Method 1500 includes steps 1510, 1530, and 1550, which may be performed by denoiser 110, scaling module 122, and merging module 124, respectively. In the following, method 1500 is discussed in the context of monochrome HDR imaging, that is, processing of only a single color channel. However, method 1500 is readily extended to color HDR image, for example in a manner similar to that discussed above in reference to FIGS. 8 and 9.

Method 1500 receives as input at three or more exposure-time-specific images captured at three or more different exposure times, respectively. The exposure-time-specific image captured at the shortest exposure time is referred to as the shortest-exposure-time image. The exposure-time-specific image captured at the longest exposure time is referred to as the longest-exposure-time image. Any exposure-time-specific image that is not the longest-exposure-time image is referred to as a shorter-exposure-time image. Any exposure-time-specific image that is not the shortest-exposure-time image is referred to as a longer-exposure-time image. For example, in the case of method 1500 receiving images 170S, 170M, and 170L, (a) image 170S is the shortest-exposure-time image, (b) image 170L is the longest-exposure-time image, (c) images 170S and 170M are both shorter-exposure-time images, and (d) images 170M and 170L are both longer-exposure-time images.

Step 1510 is performed separately for each of the shorter-exposure-time images. Each such instance of step 1510 is similar to step 710. For each of the shorter-exposure-time images, step 1510 denoises the shorter-exposure-time image based, at least in part, upon structural information obtained from the longest-exposure-time image. In one example of step 1510, denoiser 110 denoises each of images 170S and 170M based, at least in part, upon structural information obtained from image 170L. Step 1510 may include one or both of steps 1512 and 1514, similar to steps 712 and 714, respectively.

Step 1512 applies a guided filter to the shorter-exposure-time image, e.g., image 170S or 170M. The guided filter uses the longest-exposure-time image, e.g., image 170L, as its guide. The guided filter of step 1512 is, for example, a joint guided filter or a joint bilateral filter, or a different type of guided filter known in the art (see discussion above in reference to FIG. 7).

Step 1514 adapts the noise properties of the shorter-exposure-time image (e.g., image 170S or 170M after subsequent scaling in step 1530) to produce similar noise characteristics as in the longest-exposure-time image (e.g., image 170L after subsequent scaling in step 1530).

Step 1530 scales all but one of the exposure-time-specific images to place the short-exposure-time image and the long-exposure-time image on a common radiance scale. Step 1530 is an extension of step 730 to three or more different exposure times. In one example of step 1530, scaling module 122 scales at least two of images 170S, 170M, and 170L to place all of images 170S, 170M, and 170L on a common radiance scale. Step 1530 is performed after step 1510.

Step 1550 is performed after step 1530 and merges the exposure-time-specific images to generate an HDR image. Step 1550 is an extension of step 750 to three or more different exposure times. In one example of step 1550, merging module 124 merges images 170S, 170M, and 170L to form HDR image 180.

One embodiment of method 1500 is adapted to compensate for motion in the merging process. This embodiment of method 1500 further includes a step 1540, and step 1550 of this embodiment includes a step 1552. Steps 1540 and 1552 are similar to steps 740 and 752, respectively. Step 1540 evaluates the degree of discrepancy between at least some of the exposure-time-specific images. In one example of step 1540, combiner 120 compares two or three of images 170S, 170M, and 170L (before denoising by denoiser 110, between denoising by denoiser 110 and scaling by scaling module 122, or after scaling by scaling module 122) to evaluate discrepancies. Step 1540 may produce disparity parameter D.

Step 1552 generates the HDR image as a linear combination of the exposure-time-specific images, using combination weights that depend at least partly on the degree of discrepancy found in step 1540.

Method 1500 may also include a step 1520 of denoising one or more of the longer-exposure-time images. Step 1520 is an extension of step 720 to scenarios with three of more different exposure times. Step 1520 is performed before step 1530. In one example of step 1520, denoiser 110 denoises one or both of images 170M and 170L. Step 1520 may include a step 1522 of adapting the noise properties of the scaled longer-exposure-time image (e.g., image 170M or 170L after step 1530) to produce similar noise characteristics as in one or more of the scaled shorter-exposure-time image (e.g., image 170S or 170M after step 1530). Step 1522 is an extension of step 722 to scenarios with three of more different exposure times. Step 1522 may include a step 1524 of blending noise-properties of one or more shorter-exposure-time images into the longer-exposure-time image. Step 1524 is an extension of step 724 to scenarios with three of more different exposure times. In one embodiment, step 1524 includes a step 1526 that applies a guided filter to the longer-exposure-time image, using one of the shorter-exposure-time images as its guide. Step 1526 is an extension of step 726 to scenarios with three of more different exposure times.

Without departing from the scope hereof, method 1500 may integrate steps 1530 and 1550, in manner similar to the integration of scaling module 122 and merging module 124 discussed above in reference to FIG. 1.

Any of the methods described through the FIGS. 7, 8, 9 and 15 can be performed by a processor, for example processor 1110 of system 1100 of FIG. 11. A computer program can be executed in the processor to perform any of the abovementioned methods. The computer program may comprise machine-readable instructions, e.g. instructions 1130 of FIG. 11, encoded in non-transitory memory, e.g. memory 1120 in FIG. 11, to perform, when the program is executed by the processor, any of the abovementioned methods.

Combinations of Features

Features described above as well as those claimed below may be combined in various ways without departing from the scope hereof. For example, it will be appreciated that aspects of one method or product for generating an HDR image, described herein, may incorporate or swap features of another method or product for generating an HDR image described herein. The following examples illustrate some possible, non-limiting combinations of embodiments described above. It should be clear that many other changes and modifications may be made to the methods, products, and systems herein without departing from the spirit and scope of this invention (A1) A method for generating an HDR image may include (a) denoising a short-exposure-time image based, at least in part, upon structural information obtained from a long-exposure-time image, (b) after the step of denoising, scaling at least one of the short-exposure-time image and the long-exposure-time image to place the short-exposure-time image and the long-exposure-time image on a common radiance scale, and (c) after the step of scaling, merging the short-exposure-time image with the long-exposure-time image to generate the HDR image.

(A2) In the method denoted as (A1), the step of denoising may include applying a position-sensitive filter to the short-exposure-time image such that, for each local region of the short-exposure-time image, the position-sensitive filter is dependent on pixel values of a corresponding local region of the long-exposure-time image.

(A3) In either of the methods denoted as (A1) and (A2), the step of denoising may include applying a first filter to the short-exposure-time image, wherein the guided filter utilizes the long-exposure-time image as its guide.

(A4) In the method denoted as (A3), the step of applying a first guided filter may include determining a denoised version S' of the short-exposure-time image S as S'=aL+b, wherein L is the long-exposure-time image and each of coefficients a and b is a position-sensitive function of the long-exposure-time image L.

(A5) In either of the methods denoted as (A3) and (A4), the first guided filter may be selected from the group consisting of a joint bilateral filter and a joint guided filter.

(A6) Any of the methods denoted as (A1) through (A5) may further include, prior to the step of scaling, adapting noise properties of at least one of the short-exposure-time image and long-exposure-time image to mimic noise-properties of the other one of the short-exposure-time image and the long-exposure-time image.

(A7) Any of the methods denoted as (A1) through (A6) may further include, prior to the step of scaling, blending noise properties of the short-exposure-time image into the long-exposure-time image.

(A8) In the method denoted as (A7), the step of blending may include applying a second guided filter to the long-exposure-time image, the second guided filter utilizing the short-exposure-time image as its guide.

(A9) In the method denoted as (A8), the step of applying a second guided filter may include determining a modified version L' of the long-exposure-time image L as L'=cS+d, wherein S is the short-exposure-time image and each of coefficients c and d is a position-sensitive function of the short-exposure-time image S.

(A10) In the method denoted as (A9), the second guided filter may be selected from the group consisting of a joint bilateral filter and a joint guided filter.

(A11) In any of the methods denoted as (A8) through (A10), the step of blending may further include adjusting a spatial scale of the second guided filter to adjust degree to which the noise properties of the short-exposure-time image are blended into the long-exposure-time image.

(A12) Any of the methods denoted as (A1) through (A11) may further include evaluating degree of discrepancy between the short-exposure-time image and the long-exposure time image, and, in the step of merging, generating the HDR image as a linear combination of the short-exposure-time image and the long-exposure-time image using combination weights depending at least in part on the degree of discrepancy.

(A13) Any of the methods denoted as (A1) through (A12) may further include obtaining the short-exposure-time image and the long-exposure-time image from a single frame captured by a spatially-multiplexed-exposure image sensor.

(A14) In any of the methods denoted as (A1) through (A13), each of the short-exposure-time image and the long-exposure-time image may be a color image composed of a plurality of color components, and the method may include (i) performing the steps of denoising, scaling, and merging separately for each of the plurality of color components to generate a plurality of color-specific HDR images for the plurality of color components, respectively, and (ii) demosaicing the plurality of color-specific HDR images to create a full-color HDR image.

(A15) In any of the methods denoted as (A1) through (A13), each of the short-exposure-time image and the long-exposure-time image may be a color image composed of a plurality of color components, wherein the color components include a first color, and the method may include (i) for each of the color components, performing the step of denoising, wherein the structural information is obtained from the first color of the long-exposure-time image, (ii) after performing the step of denoising for each of the color components, performing the steps of scaling and merging separately for each of the color components separately to generate a plurality of color-specific HDR images for the plurality of color components, respectively, and (iii) demosaicing the plurality of color-specific HDR images to create a full-color HDR image.

(A16) Any of the methods denoted as (A1) through (A15) may further include receiving the short-exposure-time image and the long-exposure-time image from an image sensor, and outputting the HDR image to a component selected from the group consisting of a display, a non-transitory memory, and a communication bus.

(B1) A product for generating a high-dynamic-range HDR image, may include machine-readable instructions encoded in non-transitory memory, wherein the machine-readable instructions include (a) denoising instructions that, when executed by a processor, denoise a short-exposure-time image based, at least in part, upon structural information obtained from a long-exposure-time image, (b) scaling instructions that, when executed by the processor, scale at least one of the short-exposure-time image and the long-exposure-time image to place the short-exposure-time image and the long-exposure-time image on a common radiance scale, (c) merging instructions that, when executed by the processor, merge the short-exposure-time image with the long-exposure-time image to generate the HDR image, and (d) control instructions that, when executed by the processor, control the processor to (i) retrieve the short-exposure-time image and the long-exposure-time image and (ii) execute, in the following order, the denoising instructions, the scaling instructions, and the merging instructions.

(B2) In the product denoted as (B1), the machine-readable instructions may further include a first guided filter that is called by the denoising instructions, when executed by the processor, to denoise the short-exposure-time image using the long-exposure-time image as its guide.

(B3) Either of the products denoted as (B1) and (B2) may further include blending instructions that, when executed by the processor, blend noise properties of the short-exposure-time image into the long-exposure-time image, wherein the control instructions are configured to, when executed by the processor, control the processor to execute the blending instructions prior to the scaling instructions.

(B4) In the product denoted as (B3), the machine-readable instructions may further include a second guided filter that is called by the blending instructions, when executed by the processor, to blend the noise properties of the short-exposure-time image into the long-exposure-time image using the short-exposure-time image as its guide.

(B5) An HDR camera may include (I) a spatially-multiplexed-exposure image sensor configured to capture, in a single frame, a short-exposure-time image and a long-exposure-time image, (II) a processor, and (III) any of the products denoted as (B1) through (B4) for generating an HDR image from the single frame when the machine-readable instructions are executed by the processor.

(B6) In the HDR camera denoted as (B5), the spatially-multiplexed-exposure image sensor may have a bit depth of no more than 10 bits.

(B7) In the HDR camera denoted as (B6), each pixel of the spatially-multiplexed-exposure image sensor may have an area of no more than 4 square microns.

Changes may be made in the above devices, systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present devices, systems, and methods, which, as a matter of language, might be said to fall therebetween.

Various aspects of the present invention may be appreciated from the following enumerated example embodiments (EEEs):

1. A method for generating a high-dynamic-range (HDR) image, comprising:
    denoising a short-exposure-time image based, at least in part, upon structural information obtained from a long-exposure-time image;
    after the step of denoising, scaling at least one of the short-exposure-time image and the long-exposure-time image to place the short-exposure-time image and the long-exposure-time image on a common radiance scale; and
    after the step of scaling, merging the short-exposure-time image with the long-exposure-time image to generate the HDR image.

2. The method of EEE 1, the step of denoising comprising applying a position-sensitive filter to the short-exposure-time image such that, for each local region of the short-exposure-time image, the position-sensitive filter is dependent on pixel values of a corresponding local region of the long-exposure-time image.

3. The method of EEE 1 or EEE 2, the step of denoising comprising applying a first guided filter to the short-exposure-time image, the guided filter utilizing the long-exposure-time image as its guide.

4. The method of EEE 3, the step of applying a first guided filter comprising determining a denoised version S' of the short-exposure-time image S as S'=aL+b, wherein L is the long-exposure-time image and each of coefficients a and b is a position-sensitive function of the long-exposure-time image L.

5. The method of EEE 3 or EEE 4, the first guided filter being selected from the group consisting of a joint bilateral filter and a joint guided filter.

6. The method of any of EEEs 1-5, further comprising, prior to the step of scaling, adapting noise properties of at least one of the short-exposure-time image and long-exposure-time image to mimic noise-properties of the other one of the short-exposure-time image and the long-exposure-time image.

7. The method of any of EEEs 1-6, further comprising, prior to the step of scaling, blending noise properties of the short-exposure-time image into the long-exposure-time image.

8. The method of EEE 7, the step of blending comprising applying a second guided filter to the long-exposure-time image, the second guided filter utilizing the short-exposure-time image as its guide.

9. The method of EEE 8, the step of applying a second guided filter comprising determining a modified version L' of the long-exposure-time image L as L'=cS+d, wherein S is the short-exposure-time image and each of coefficients c and d is a position-sensitive function of the short-exposure-time image S.

10. The method of EEE 9, the second guided filter being selected from the group consisting of a joint bilateral filter and a joint guided filter.

11. The method of any of EEEs 8-10, the step of blending further comprising adjusting a spatial scale of the second guided filter to adjust degree to which the noise properties of the short-exposure-time image are blended into the long-exposure-time image.

12. The method of any of EEEs 1-11, further comprising:
    evaluating degree of discrepancy between the short-exposure-time image and the long-exposure time image; and
    in the step of merging, generating the HDR image as a linear combination of the short-exposure-time image and the long-exposure-time image using combination weights depending at least in part on the degree of discrepancy.

13. The method of any of EEEs 1-12, further comprising obtaining the short-exposure-time image and the long-exposure-time image from a single frame captured by a spatially-multiplexed-exposure image sensor.

14. The method of any of EEEs 1-13, each of the short-exposure-time image and the long-exposure-time image being a color image composed of a plurality of color components, the method comprising:
    performing the steps of denoising, scaling, and merging separately for each of the plurality of color components to generate a plurality of color-specific HDR images for the plurality of color components, respectively; and
    demosaicing the plurality of color-specific HDR images to create a full-color HDR image.

15. The method of any of EEEs 1-14, each of the short-exposure-time image and the long-exposure-time image being a color image composed of a plurality of color components, the color components including a first color, the method comprising:
    for each of the color components, performing the step of denoising, wherein the structural information is obtained from the first color of the long-exposure-time image;
    after performing the step of denoising for each of the color components, performing the steps of scaling and merging separately for each of the color components separately to generate a plurality of color-specific HDR images for the plurality of color components, respectively; and
    demosaicing the plurality of color-specific HDR images to create a full-color HDR image.

16. The method of any of EEEs 1-15, further comprising:
    receiving the short-exposure-time image and the long-exposure-time image from an image sensor; and
    outputting the HDR image to a component selected from the group consisting of a display, a non-transitory memory, and a communication bus.

17. A product for generating a high-dynamic-range HDR image, comprising machine-readable instructions encoded in non-transitory memory, the machine-readable instructions including:
    denoising instructions that, when executed by a processor, denoise a short-exposure-time image based, at least in part, upon structural information obtained from a long-exposure-time image;
    scaling instructions that, when executed by the processor, scale at least one of the short-exposure-time image and the long-exposure-time image to place the short-exposure-time image and the long-exposure-time image on a common radiance scale;
    merging instructions that, when executed by the processor, merge the short-exposure-time image with the long-exposure-time image to generate the HDR image; and
    control instructions that, when executed by the processor, control the processor to (a) retrieve the short-exposure-time image and the long-exposure-time image and (b) execute, in the following order, the denoising instructions, the scaling instructions, and the merging instructions.

18. The product of EEE 17, the machine-readable instructions further comprising a first guided filter that is called by the denoising instructions, when executed by the processor, to denoise the short-exposure-time image using the long-exposure-time image as its guide.

19. The product of EEE 17 or EEE 18, further comprising blending instructions that, when executed by the processor, blend noise properties of the short-exposure-time image into the long-exposure-time image, the control instructions being configured to, when executed by the processor, control the processor to execute the blending instructions prior to the scaling instructions.

20. The product of EEE 19, the machine-readable instructions further comprising a second guided filter that is called by the blending instructions, when executed by the processor, to blend the noise properties of the short-exposure-time image into the long-exposure-time image using the short-exposure-time image as its guide.

21. An HDR camera, comprising:
a spatially-multiplexed-exposure image sensor configured to capture, in a single frame, a short-exposure-time image and a long-exposure-time image;
a processor; and
the product of any of EEEs 17-20 for generating an HDR image from the single frame when the machine-readable instructions are executed by the processor.

22. The HDR camera of EEE 21, the spatially-multiplexed-exposure image sensor having a bit depth of no more than 10 bits.

23. The HDR camera of EEE 22, each pixel of the spatially-multiplexed-exposure image sensor having an area of no more than 4 square microns.

The invention claimed is:

1. A method for generating a high-dynamic-range (HDR) image, comprising:
denoising a short-exposure-time image, wherein denoising comprises
applying a first guided filter to the short-exposure-time image, the guided filter utilizing a long-exposure-time image as its guide,
after the step of denoising, applying a second guided filter to the long-exposure-time image, the second guided filter utilizing the short-exposure-time image as its guide, and scaling at least one of the short-exposure-time image and the long-exposure-time image to place the short-exposure-time image and the long-exposure-time image on a common radiance scale; and
after the step of scaling, merging the short-exposure-time image with the long-exposure-time image to generate the HDR image.

2. The method of claim 1, the step of denoising comprising applying a position-sensitive filter to the short-exposure-time image such that, for each local region of the short-exposure-time image, the position-sensitive filter is dependent on pixel values of a corresponding local region of the long-exposure-time image.

3. The method of claim 1, wherein the step of applying the first guided filter comprises determining a pixel value in the denoised short-exposure-time image as a linear function of a corresponding pixel value in the long-exposure-time image in a local region of the short-exposure-time image at said pixel value in the denoised short-exposure-time image.

4. The method of claim 1, wherein the step of applying the first guided filter comprises determining a i'-th pixel value in the denoised short-exposure-time image S as $S'_{S,i}=aS_{L,i}+b$, wherein $S_{L,i}$ is the pixel value of the long-exposure-time image, and wherein each of coefficients a and b depends on pixel values in a local region of the short-exposure-time image at the i'-th pixel.

5. The method of claim 4, wherein each of the coefficients a and b are position sensitive.

6. The method of claim 1, the first guided filter being selected from the group of filters comprising: a joint bilateral filter and a joint guided filter.

7. The method of claim 1, wherein the step of applying the second guided filter comprises determining a pixel value in the denoised long-exposure-time image as a linear function of a corresponding pixel value in the short-exposure-time image in a local region of the long-exposure-time image at said pixel value in the denoised long-exposure-time image.

8. The method of claim 1, the step of applying the second guided filter comprising determining an i'-th pixel value in the denoised long-exposure-time image L as $S'_{L,i}=c\cdot S_{S,i}+d$, wherein $S_{S,i}$ is the pixel value of the short-exposure-time image and each of coefficients c and d depends on pixel values in a local region of the long-exposure-time image at the i'-th pixel.

9. The method of claim 8, wherein the coefficients c and d are position sensitive.

10. The method of claim 1, the second guided filter being selected from the group of filters comprising: a joint bilateral filter and a joint guided filter.

11. The method of claim 1, further comprising adjusting a spatial scale of the second guided filter to adjust a degree to which noise properties of the short-exposure-time image are blended into the long-exposure-time image.

12. The method of claim 1, further comprising:
evaluating a degree of discrepancy between the short-exposure-time image and the long-exposure time image; and
in the step of merging, generating the HDR image as a linear combination of the short-exposure-time image and the long-exposure-time image using combination weights depending at least in part on the degree of discrepancy.

13. The method of claim 1, further comprising obtaining the short-exposure-time image and the long-exposure-time image from a single frame captured by a spatially-multiplexed-exposure image sensor.

14. The method of claim 1, each of the short-exposure-time image and the long-exposure-time image being a color image composed of a plurality of color components, the method comprising:
performing the steps of denoising, scaling, and merging separately for each of the plurality of color components to generate a plurality of color-specific HDR images for the plurality of color components, respectively; and
demosaicing the plurality of color-specific HDR images to create a full-color HDR image.

15. The method of claim 1, each of the short-exposure-time image and the long-exposure-time image being a color image composed of a plurality of color components, the color components including a first color, the method comprising:
for each of the color components, performing the step of denoising, based at least partly on the first color of the long-exposure-time image;
after performing the step of denoising for each of the color components, performing the steps of scaling and merging separately for each of the color components separately to generate a plurality of color-specific HDR images for the plurality of color components, respectively; and
demosaicing the plurality of color-specific HDR images to create a full-color HDR image.

16. The method of claim 1, further comprising:
receiving the short-exposure-time image and the long-exposure-time image from an image sensor; and
outputting the HDR image to a component selected from the group consisting of a display, a non-transitory memory, and a communication bus.

17. An HDR camera, comprising:
a spatially-multiplexed-exposure image sensor configured to capture, in a single frame, a short-exposure-time image and a long-exposure-time image;
a processor for executing the method of claim 1.

18. A non-transitory computer-readable storage medium having stored thereon computer-executable instructions for executing with one or more processors a method in accordance the method of claim 1.

\* \* \* \* \*